US012526399B2

(12) United States Patent
Lee et al.

(10) Patent No.: US 12,526,399 B2
(45) Date of Patent: Jan. 13, 2026

(54) ELECTRONIC EQUIPMENT FOR DISPLAYING FLOATING IMAGE

(71) Applicant: LG ELECTRONICS INC., Seoul (KR)

(72) Inventors: Yonguk Lee, Seoul (KR); Joonyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/862,456

(22) PCT Filed: May 3, 2022

(86) PCT No.: PCT/KR2022/006366
§ 371 (c)(1),
(2) Date: Nov. 1, 2024

(87) PCT Pub. No.: WO2023/214598
PCT Pub. Date: Nov. 9, 2023

(65) Prior Publication Data
US 2025/0350717 A1  Nov. 13, 2025

(51) Int. Cl.
H04N 7/18 (2006.01)
G03H 1/00 (2006.01)
(Continued)

(52) U.S. Cl.
CPC ......... H04N 13/383 (2018.05); G03H 1/0005 (2013.01); H04N 13/302 (2018.05); G03H 2001/0088 (2013.01)

(58) Field of Classification Search
CPC .................................................. H04N 13/383
(Continued)

(56) References Cited

U.S. PATENT DOCUMENTS 11,533,443 B2 * 12/2022 Legerton ................ H04N 23/80
2008/0060237 A1 * 3/2008 Chiang .................... G09F 13/22
40/564

(Continued)

FOREIGN PATENT DOCUMENTS

KR 10-1350526 B1 1/2014
KR 10-1567002 B1 11/2015
(Continued)

OTHER PUBLICATIONS

Kim et al., "Development of Interactive Signage using Floating Hologram", the Journal of Korea Institute of Convergence Signal Processing, Dec. 2018, vol. 19, No. 4, p. 180-185.

Primary Examiner — Leron Beck
(74) Attorney, Agent, or Firm — Birch, Stewart, Kolasch & Birch, LLP

(57) ABSTRACT

Electronic equipment for displaying a floating image, according to an embodiment, comprises: a display configured to display the floating image to be floated and spaced apart in an upward direction; and a 3D plate having the display arranged in an inner area thereof, and configured to display the floating image in an inclined state in an upper area thereof, wherein an active area of the display is configured to be larger than a floating area in which the floating image is displayed. The electronic equipment may further comprise a camera which is arranged in an inner plate in the inner area and configured to track the gaze of a user present outside the 3D plate.

14 Claims, 14 Drawing Sheets

(51) Int. Cl.
*H04N 13/302* (2018.01)
*H04N 13/383* (2018.01)

(58) Field of Classification Search
USPC .......................................................... 348/51
See application file for complete search history.

(56) References Cited

U.S. PATENT DOCUMENTS

| | | | | |
|---|---|---|---|---|
| 2008/0297589 | A1* | 12/2008 | Kurtz | H04N 7/15 |
| | | | | 348/E7.083 |
| 2014/0192281 | A1* | 7/2014 | Smithwick | G02B 30/52 |
| | | | | 345/426 |
| 2016/0005219 | A1* | 1/2016 | Powell | G06F 3/0425 |
| | | | | 345/426 |
| 2021/0156695 | A1* | 5/2021 | Zhang | G06T 19/006 |
| 2022/0214560 | A1* | 7/2022 | Yang | G02B 27/0093 |

FOREIGN PATENT DOCUMENTS

| | | |
|---|---|---|
| KR | 10-2017-0104463 A | 9/2017 |
| KR | 10-2267430 B1 | 6/2021 |

* cited by examiner

ELECTRONIC EQUIPMENT FOR DISPLAYING FLOATING IMAGE

CROSS REFERENCE TO RELATED APPLICATIONS

This application is the National Phase of PCT/KR2022/006366 filed on May 3, 2022, which is hereby expressly incorporated by reference into the present application.

TECHNICAL FIELD

One or more embodiments relate to a method for representing realistic images. A specific implementation relates to electronic equipment for displaying a floating image.

BACKGROUND ART

Kiosks, signages, and the like are types of display devices such as image (or video) display devices. The kiosk refers to an unmanned computer system device used in public places. The digital signage is a communication tool for enabling marketing, advertisement, and training effects of enterprises and customer experiences, and refers to a digital image (video) device that provides broadcast programs or specific information at public places such as airports, hotels, hospitals, etc.

To enhance user experiences (UE), content displayed through these display devices may be provided in the form of 3D content in addition to 2D content. 3D images that constitute 3D content may be displayed at certain spacings therebetween on a horizontal plane in a display area of a display device. Accordingly, 3D images displayed on a display device may include a floating image or a holographic image.

Accordingly, a display device that displays a floating 3D image may be referred to as a 3D display device. A kiosk or signage that displays a floating 3D image may be referred to as a floating 3D kiosk or a floating 3D signage.

A floating 3D kiosk may enable a user to view a 3D image projected onto a space by using a transparent optical material, such as a micromirror array. Additionally, it may allow for direct touching of objects floating in the air, to provide interaction between the objects and the user. However, due to the optical characteristics of a floating 3D display, a viewing angle is narrow in a vertical (up-down) direction. This causes a problem in that an upper or lower portion of a floating image is cut off depending on a height at which the user is viewing the floating image. For example, when the user's viewing angle is out of the range of −10 to +10 degrees or −15 to +15 degrees, the user may view a floating image with an upper or lower portion cut off.

DISCLOSURE OF INVENTION

Technical Problem

The disclosure is directed at solving the aforementioned problems and other drawbacks. Another aspect of the disclosure is to solve the problem that an image is partially cut off depending on a viewing angle in an electronic device (electronic equipment) for displaying floating images.

Another aspect of the disclosure is to propose various methods for improving a narrow vertical viewing angle of a floating 3D kiosk.

Another aspect of the disclosure is to restore a partially cut image to an original image by changing an image display area when the image is partially cut off according to a user's viewing angle.

Another aspect of the disclosure is to provide user guidance (UX/UI) when a user's viewing angle exceeds a vertical movement range.

Another aspect of the disclosure is to secure a sufficient vertical (up-down) viewing angle by tracking a user's gaze and regenerating an image accordingly.

Solution to Problem

In order to achieve the above or other aspects according to one or more embodiments, an electronic device for displaying a floating image may include a display configured to display the floating image to float thereabove at a spacing; a three-dimensional (3D) plate having the display arranged in an inner region thereof, and configured to display the floating image in a tilted state in an upper area; and a camera disposed on an inner plate of the inner region, and configured to track a gaze of a user outside the 3D plate, wherein an active region of the display may be larger than a floating region where the floating image is displayed. The electronic device may further include a camera disposed on an inner plate of the inner region, and configured to track a gaze of a user outside the 3D plate.

In an embodiment, the electronic device may further include a processor operatively coupled to the camera and configured to control the floating region to be moved upward or downward based on the tracked gaze.

In an embodiment, the processor may determine whether a lower portion as a portion of the floating image is not displayed as the gaze is moved upward. The processor may control a guide image to be displayed in an upper area of the floating image and control the display such that the floating region is moved downward, when it is determined that the lower portion as the portion of the floating image is not displayed.

In an embodiment, the processor may determine whether an upper portion as a portion of the floating image is not displayed as the gaze is moved downward. The processor may control a guide image to be displayed in a lower area of the floating image and control the display such that the floating region is moved upward, when it is determined that the upper portion as the portion of the floating image is not displayed.

In an embodiment, the processor may determine whether a portion of the floating image is not displayed as the floating region is moved to right or left within the active region in response to the gaze being moved to left or right.

In an embodiment, the processor may control a guide image to be displayed in a right area or left area of the floating image and control the display such that the floating region is moved to right or to left when it is determined that the left area or right area as the portion of the floating image is not displayed.

In an embodiment, the processor may include an eye tracking block configured to execute image signal processing (ISP) and an eye tracking algorithm for an image input from the camera. The processor may include a position check block configured to determine whether the floating image is visible without a partial area being cut off, based on a user's eye position acquired by the eye tracking block.

In an embodiment, the processor may include an image generation block configured to generate the floating image so that the floating image is displayed at a corresponding position according to a user's touch input. The processor may include an image regeneration block configured to receive information on coordinates, to which the floating image is to be moved, from the position check block, and regenerate the floating image into a second floating image so that a display position of the floating image is changed.

In an embodiment, the processor may display the floating image when the gaze belongs to a vertical viewing angle range, and determine whether the gaze is moved upward and whether a lower portion of the floating image has been cut off, based on coordinates of a rendering start position which is a position of a lower portion where the floating image is rendered. The processor may determine whether the gaze is moved upward and whether the lower portion of the floating image has been cut off, based on the coordinates of the rendering start position of the floating image and size information on the floating image.

In an embodiment, the processor may display the floating image when the gaze belongs to a vertical viewing angle range. The processor may control a guide image to be displayed in an upper area of the floating image when it is determined that the gaze is moved upward out of the vertical viewing angle range. The processor may control a guide image to be displayed in a lower area of the floating image when it is determined that the gaze is moved downward out of the vertical viewing angle range.

In an embodiment, the processor may display the floating image when the gaze belongs to a vertical viewing angle range. The processor may render the floating image into a second floating image so that the floating image is moved upward, when the gaze is moved upward in a state where a lower portion of the floating image has been cut off. The second floating image may be set a normal image which is displayed within the active region and in which the gaze is within the vertical viewing angle range.

In an embodiment, the processor may display the floating image when the gaze belongs to a vertical viewing angle range. The processor may render the floating image into a third floating image so that the floating image is moved downward, when the gaze is moved downward in a state where an upper portion of the floating image has been cut off. The third floating image may be set a normal image which is displayed within the active region and in which the gaze is within the vertical viewing angle range.

In an embodiment, the processor may receive information on second coordinates, to which the floating image is to be moved, through the position check block. The processor may determine, based on coordinates of a rendering start position of a second floating image to be regenerated through the image regeneration block, whether the gaze is moved downward and whether an upper portion of the second floating image has been cut off. The processor may receive information on third coordinates, to which the second floating image is to be moved, through the position check block according to an upward movement of the gaze, when it is determined that the upper portion of the second floating image has been cut off. The processor may display the third floating image within the active region through the image regeneration block, based on information on the third coordinates to which the second floating image is to be moved. The third floating image may be displayed in a higher area within the active region than the second floating image.

In an embodiment, the processor may receive information on second coordinates, to which the floating image is to be moved, through the position check block. The processor may determine whether the gaze is moved upward and whether a lower portion of the second floating image has been cut off, based on coordinates of a rendering start position of a second floating image to be regenerated through the image regeneration block. The processor may receive information on third coordinates, to which the second floating image is to be moved, from the position check block according to a downward movement of the gaze, when it is determined that a lower portion of the second floating image has been cut off. The processor may display the third floating image within the active region through the image regeneration block, based on the information on the third coordinates, to which the second floating image is to be moved. The third floating image may be displayed in a lower area within the active region than the second floating image.

In an embodiment, the processor may receive information on second coordinates, to which the floating image is to be moved, through the position check block. The processor may determine whether the gaze is moved downward and whether an upper portion of the second floating image has been cut off, based on coordinates of a rendering start position of a second floating image to be regenerated through the image regeneration block. The processor may regenerate the second floating image into a third floating image of a smaller size through the image regeneration block when the gaze is not moved upward while the upper portion of the second floating image is cut off. The third floating image may have a higher resolution than the second floating image and may be disposed within the active region.

In an embodiment, the processor may receive information on second coordinates, to which the floating image is to be moved, through the position check block. The processor may determine whether the gaze is moved upward and whether a lower portion of the second floating image has been cut off, based on coordinates of a rendering start position of a second floating image to be regenerated through the image regeneration block. The processor may regenerate the second floating image into a third floating image of a smaller size through the image regeneration block when the gaze is not moved downward while the lower portion of the second floating image is cut off. The third floating image may have a higher resolution than the second floating image and may be disposed within the active region.

According to one or more embodiments, a display device for displaying a floating image may include: a display configured to display the floating image to float thereabove at a spacing; and a three-dimensional (3D) plate having the display arranged in an inner region thereof, and configured to display the floating image in a tilted state in an upper area. The display device may include: a camera disposed on an inner plate of the inner region, and configured to track a gaze of a user outside the 3D plate; and a processor operatively coupled to the camera and configured to control an upward or downward movement of the floating region based on the tracked gaze. An active region of the display may be larger than a floating region where the floating image is displayed.

In an embodiment, the processor may determine whether a lower portion as a portion of the floating image is not displayed as the gaze is moved upward. The processor may control a guide image to be displayed in an upper area of the floating image and control the display such that the floating region is moved downward, when it is determined that the lower portion as the portion of the floating image is not displayed.

In an embodiment, the processor may determine whether an upper portion as a portion of the floating image is not displayed as the gaze is moved downward. The processor may control a guide image to be displayed in a lower area of the floating image and control the display such that the floating region is moved upward, when it is determined that the upper portion as the portion of the floating image is not displayed.

In an embodiment, the processor may display the floating image when the gaze belongs to a vertical viewing angle range. The processor may control a guide image to be displayed in an upper area of the floating image when it is determined that the gaze is moved upward out of the vertical viewing angle range. The processor may control a guide image to be displayed in a lower area of the floating image when it is determined that the gaze is moved downward out of the vertical viewing angle range.

In an embodiment, the processor may display the floating image when the gaze belongs to a vertical viewing angle range. The processor may render the floating image into a second floating image so that the floating image is moved upward, when the gaze is moved upward in a state where a lower portion of the floating image has been cut off. The second floating image may be set a normal image which is displayed within the active region and in which the gaze is within the vertical viewing angle range.

Advantageous Effects of Invention

The technical effects of an electronic device for displaying a floating image according to the disclosure will be described as follows.

According to an embodiment, a problem that an image is partially cut off depending on a viewing angle in an electronic device (electronic equipment) for displaying a floating image may be solved.

According to an embodiment, various methods may be provided to improve a narrow vertical viewing angle of a floating 3D kiosk by recognizing and tracking a user's gaze.

According to an embodiment, an original image may be restored by changing an image display area when a portion of an image is cut off according to a user's viewing angle.

Another aspect of the disclosure, a floating image may be controlled to be displayed within a user's viewing angle range by providing a user guide UX/UI when a user's viewing angle exceeds a vertical movement range.

According to an embodiment, a floating image may be regenerated to be appropriate for a solution such as user gaze tracking and a gaze position, thereby securing a sufficient vertical viewing angle.

According to an embodiment, a display position of a floating image may be optimized upward or downward within an active region of a display by determining whether a user's gaze exceeds a vertical movement range.

According to an embodiment, a guide image may be provided in a vertical direction of a floating 3D image projected on a space using a user guide UX/UI to position a user's gaze within a viewing angle.

According to an embodiment, during viewing of a floating 3D image, there may be no limitation on a vertical viewing angle even when viewing positions of users, who have different heights, are moved up and down, so that the users can view the floating 3D image without a cutting issue.

According to an embodiment, a visually comfortable floating 3D image may be provided to users and technological differentiation from other technologies may be allowed by enhancing visibility.

Further scope of applicability of the disclosure will become apparent from the following detailed description. It should be understood, however, that the detailed description and specific examples, such as the preferred embodiments of the disclosure, are given by way of illustration only, since various changes and modifications within the spirit and scope of the disclosure will be apparent to those skilled in the art.

MODE FOR THE INVENTION

Figure 1:
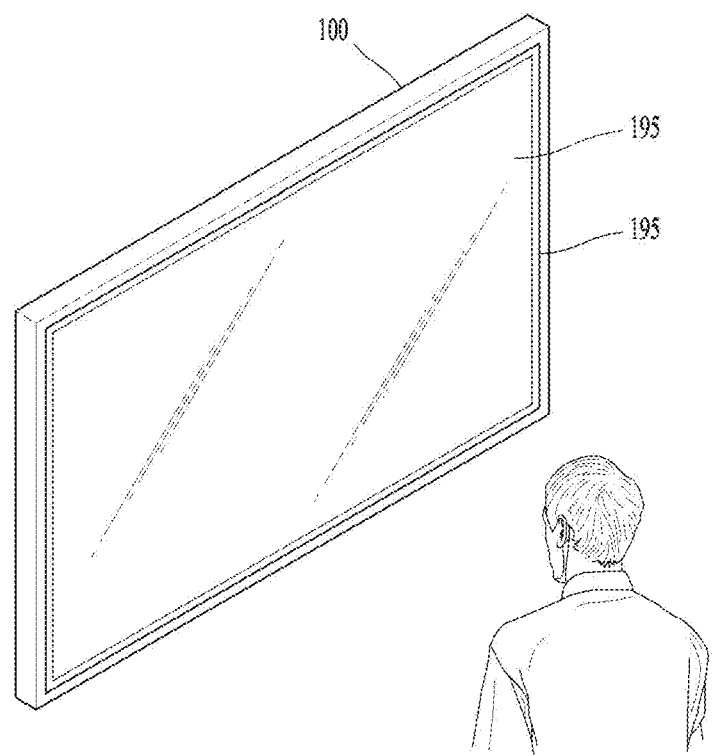
FIG. 1 is a block diagram illustrating the appearance of an image display device according to one embodiment.

A description will now be given in detail according to exemplary embodiments disclosed herein, with reference to the accompanying drawings. For the sake of a brief description with reference to the drawings, the same or like components will be assigned the same reference numerals, and the description thereof will be omitted. In general, suffixes such as "module" and "unit" may be used to refer to elements or components. Use of such suffixes herein is merely intended to facilitate the description of the specification, and the suffixes themselves are not intended to give any special meanings or functions. In describing the disclosure, if a detailed explanation for a related known function or construction is considered to unnecessarily divert the gist of the disclosure, such explanation will be omitted. The accompanying drawings are used to help easily understand the technical idea of the disclosure and it should be understood that the idea of the disclosure is not limited by the accompanying drawings. The idea of the disclosure should be construed to extend to any alterations, equivalents, and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected," or "coupled" to another element, the element may be connected or coupled to the another element or intervening elements may also be present. In contrast, when an element is referred to as being "directly connected" or "directed coupled" to another element, it should be understood that there are no intervening elements present.

As used herein, the singular forms are intended to include the plural forms as well, unless the context clearly indicates otherwise.

In the disclosure, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

An electronic device described herein may be applied to stationary terminals such as digital TVs, desktop computers, kiosks, digital signages, etc. In particular, the electronic device described herein may be applied to non-contact type display devices, i.e., image display devices, such as kiosks and digital signages.

Figure 2:
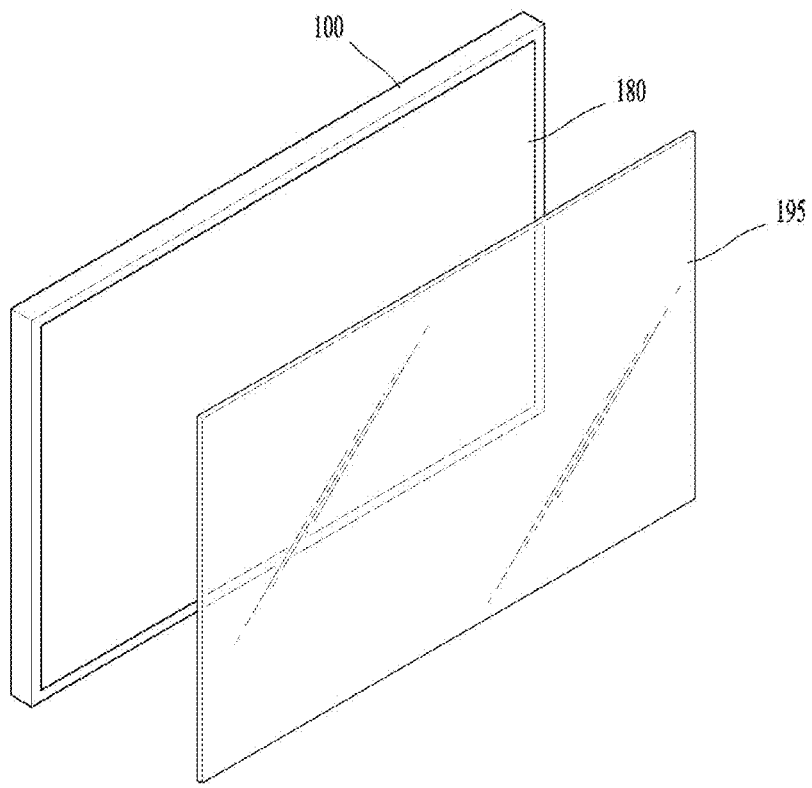
FIG. 2 is a diagram illustrating that a lens unit and a display of the image display device of FIG. 1 are separated from each other.

FIG. 1 is a block diagram illustrating the appearance of an image display device according to one embodiment. FIG. 2 is a diagram illustrating a lens unit and a display of the image display device of FIG. 1 in a detached state.

Referring to FIGS. 1 and 2, an image display device according to one embodiment may be an image display device capable of displaying stereoscopic images, that is, 3D images. For this purpose, an image display device 100 may include a display 180 and a lens unit 195. The display 180 may output an input image, particularly, a multi-viewpoint image according to an embodiment. In some embodiments, sub-pixels constituting a multi-viewpoint image may be displayed by being arranged in a certain pattern.

The lens unit 195 may be spaced at a certain interval apart from the display 180 and disposed toward a user. In FIG. 2, it is illustrated that the display 180 and the lens unit 195 are separated from each other. Meanwhile, the lens unit 195 may be of a lenticular type using a lenticular lens, a parallax type using a slit array, or a type using a microlens array.

In an electronic device (electronic equipment) that displays a three-dimensional (3D) image, such as a floating image or a holographic image according to the specification, a 3D plate 195 for displaying the 3D image may be disposed on top of the display 180.

Figure 3:
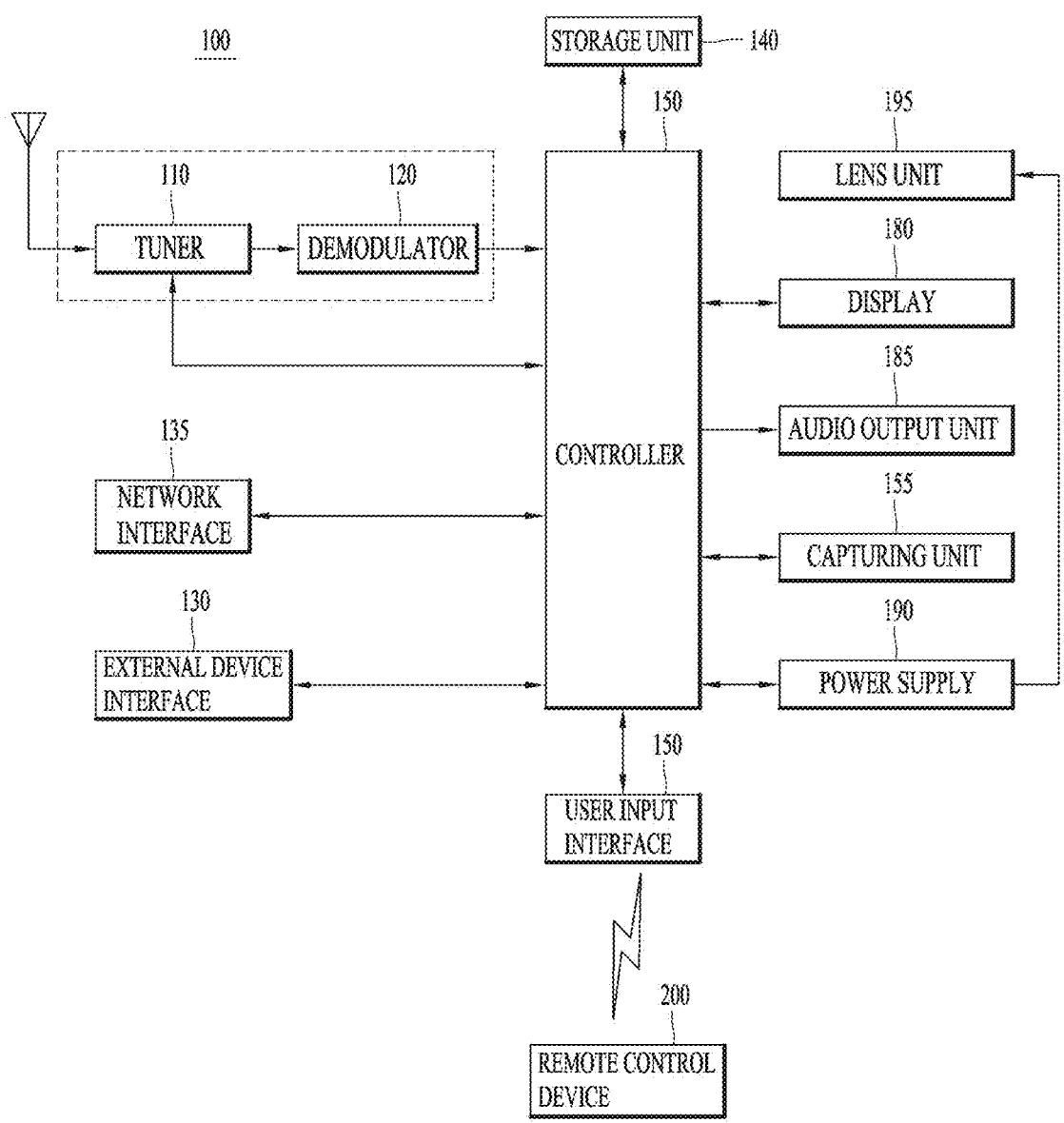
FIG. 3 is an internal block diagram of an image display device according to one embodiment.

FIG. 3 is an internal block diagram of an image display device according to one embodiment. Referring to FIG. 3, an image display device 100 according to an embodiment may include a broadcast receiver 105, an external device interface 130, a storage unit (memory) 140, a user input interface 150, a capturing unit 155, a sensor part (not illustrated), a controller 170, a display 180, an audio output unit 185, a power supply 190, and a lens unit 195.

The broadcast receiver 105 may include a tuner 110, a demodulator 120, and a network interface 130. Of course, depending on the need, the broadcast receiver 105 may be designed to include the tuner 110 and the demodulator 120 without the network interface 130 or may conversely be designed to include the network interface 130 without the tuner 110 and the demodulator 120.

The tuner 110 may tune in to a radio frequency (RF) broadcast signal, which corresponds to a channel selected by a user, among RF broadcast signals received through an antenna, or to every pre-stored channel. The tuner 110 may also convert the selected RF broadcast signal into an intermediate frequency signal or a baseband video (image) or audio signal.

For example, when the selected RF broadcast signal is a digital broadcast signal, the tuner 110 may convert the RF broadcast signal into a digital IF signal (DIF), and when the RF broadcast signal is an analog broadcast signal, the tuner 110 may convert the RF broadcast signal into an analog baseband video or an audio signal (CVBS/SIF). That is, the tuner 110 may process a digital broadcast signal or an analog broadcast signal. The analog baseband video or audio signal (CVBS/SIF) output from the tuner 110 may be directly input to the controller 170.

In addition, the tuner 110 may receive a single-carrier RF broadcast signal according to an advanced television system committee (ATSC) standard or a multi-carrier RF broadcast signal carrier according to a digital video broadcasting (DVB) standard. The tuner 110 may sequentially select RF broadcast signals of all broadcast channels stored through a channel memory function, among RF broadcast signals received through an antenna, and convert the RF broadcast signals into an intermediate frequency signal or a baseband video or audio signal. The tuner 110 may be provided in plurality to receive broadcast signals of a plurality of channels. Alternatively, the tuner 110 may be configured as a single tuner to receive broadcast signals of a plurality of channels simultaneously.

The demodulator 120 may receive a digital IF signal (DIF) converted by the tuner 110 and perform a demodulation operation. The demodulator 120 may perform demodulation and channel decoding and then output a stream signal (TS). In this instance, the stream signal may be a multiplexed signal of an image signal, an audio signal, or a data signal. The stream signal output from the demodulator 120 may be input to the controller 170. The controller 170 may perform demultiplexing, video/audio signal processing, etc., and then output a video to the display 180 and audio to the audio output unit 185.

The external device interface 130 may transmit or receive data to or from a connected external device 190. To this end, the external device interface 130 may include an A/V input/output unit (not illustrated) or a wireless communication unit (not illustrated). The external device interface 130 may be connected with external devices such as a digital versatile disk (DVD), a Blu ray player, a game device, a camera, a camcorder, a computer (laptop), a set-top box, etc., in a wired/wireless manner, and may also perform input/output operations with the external devices.

The A/V input/output unit may receive video and audio signals from external devices. Meanwhile, the wireless communication unit may perform short-range wireless communications with other electronic devices.

The network interface 135 may serve as an interface between the image display device 100 and a wired/wireless network including the Internet. For example, the network interface 135 may receive content or data provided from the Internet or from a content provider or network operator over a network.

The storage unit 140 may store programs for signal processing and control within the controller 170, and may also store signal-processed image, audio, or data signals.

The storage unit 140 may also perform a function for temporary storage of an image, audio, or data signal received from the external device interface 130. Additionally, the storage unit 140 may store information related to a certain broadcast channel through a channel storage function such as a channel map.

Although FIG. 3 illustrates an embodiment in which the storage unit 140 is provided separately from the controller 170, the scope of the disclosure is not limited thereto. The storage unit 140 may be included in the controller 170. The user input interface 150 may forward a signal input by a user to the controller 170 or forward a signal from the controller 170 to the user.

For example, the user input interface 150 may transmit/receive user input signals such as power on/off, channel selection, screen settings, etc. to or from a remote control device 200, or forward user input signals input through local keys (not illustrated) such as a power key, channel key, volume key, setting value, etc. to the controller 170. Alternatively, the user input interface 150 may forward a user input signal input from a sensor part (not illustrated), which senses a user's gesture, to the controller 170 or forward a signal from the controller 170 to the sensor part (not illustrated).

The controller 170 may generate and output signals for outputting video or audio by demultiplexing streams input through the tuner 110 or demodulator 120 or the external device interface 130 or processing demultiplexed signals.

An image signal processed in the controller 170 may be input to the display 180 and displayed as an image corresponding to the image signal. The image signal processed in the controller 170 may also be input to an external output device through the external device interface 130.

The audio signal processed in the controller 170 may be output as a voice to the audio output unit 185. The audio signal processed in the controller 170 may also be input to an external output device through the external device interface 130.

Although not illustrated in FIG. 3, the controller 170 may include a demultiplexer, an image processer, etc. This will be described in detail later with reference to FIG. 4.

Besides, the controller 170 may control an overall operation within the image display device 100. For example, the controller 170 may control the tuner 110 to tune in to an RF broadcast corresponding to a user-selected channel or a pre-stored channel.

The controller 170 may control the image display device 100 according to a user command input through the user input interface 150 or according to an internal program.

Meanwhile, the controller 170 may control the display 180 to display an image. In this instance, the image displayed on the display 180 may be a still image or a video, and may also be a 3D image.

Meanwhile, the controller 170 may generate and display a 3D object for a certain object in the image displayed on the display 180. For example, an object may be at least one of an accessed web page (e.g., a newspaper, a magazine, etc.), an electronic program guide (EPG), various menus, a widget, an icon, a still image, a video, and text.

The 3D object may be processed to have a different depth from the image displayed on the display 180. Preferably, the 3D object may be processed to appear to protrude more than the image displayed on the display 180.

Meanwhile, the controller 170 may recognize a user's location based on an image captured by a capturing unit 155. For example, the controller 180 may recognize a distance (z-axial coordinates) between the user and the image display device 100. Also, the controller 180 may recognize x-axial coordinates and y-axial coordinates within the display 180 corresponding to the user's location.

Although not shown, the image display device 100 may further include a channel browsing processor, which generates a thumbnail image corresponding to a channel signal or an external input signal. The channel browsing processor may receive a stream signal (TS) output from the demodulator 120 or a stream signal output from the external device interface 130, extract an image from the received stream signal, and generate a thumbnail image. The generated thumbnail image may be stream-decoded together with a decoded image or the like and the decoded thumbnail image may then be input to the controller 170. The controller 170 may display a thumbnail list including a plurality of thumbnail images on the display 180 using the input thumbnail image. The thumbnail list may be displayed in a simple view manner such that the list is displayed on a partial area while a certain image is displayed on the display 180, or in a full view manner such that the list is displayed on a most area of the display 180. Thumbnail images within the thumbnail list may be sequentially updated.

The display 180 may generate a drive signal by converting an image signal, a data signal, an OSD signal, or a control signal processed by the controller 170 or an image signal, a data signal, or a control signal received from the external device interface 130.

The display 180 may be a PDP, LCD, OLED, flexible display, etc., and also be a 3D display. As described above, the display 180 according to an embodiment may be a display which is capable of displaying 3D images in a glassless manner without requiring separate glasses. To this end, a lenticular lens unit 195 may be provided.

The power supply 190 may supply power to the image display device 100. Accordingly, each module or unit within the image display device 100 may operate.

Additionally, the display 180 may be configured to include a 2D image area and a 3D image area, and in this instance, the power supply 190 may supply first power and second power, which are different from each other, to the lens unit 195. The first power and the second power may be supplied under the control of the controller 170.

The lens unit 195 may change the traveling direction of light, depending on applied power. The first power may be applied to a first area of the lens unit corresponding to the 2D image area of the display 180, and accordingly, light may be emitted in the same direction as light emitted from the 2D image area of the display 180. Accordingly, the user may recognize a displayed 2D image as a 2D image.

As another example, the second power may be applied to a second area of the lens unit corresponding to the 3D image area of the display 180, and accordingly, light emitted from the 3D image area of the display 180 may be scattered, thereby generating scattered light. This may result in providing a 3D effect such that the user is tricked into perceiving the displayed 3D image as a stereoscopic image without having to wear separate glasses.

The lens unit 195 may be spaced apart from the display 180 and disposed toward the user. In particular, the lens unit 195 which is spaced apart from the display 180 may be parallel to the display 180, tilted at a predetermined angle, or concave or convex. The lens unit 195 may take the form of a sheet. Accordingly, the lens unit 195 according to an embodiment may also be named a lens sheet, a 3D sheet, or a 3D plate.

Meanwhile, the display 180 may be configured as a touch screen and may also be used as an input device in addition to an output device. The audio output unit 185 may receive an audio signal processed by the controller 170 and output the received audio signal as voice.

The capturing unit 155 may capture the user. The capturing unit 155 may be implemented with one camera, but is not limited thereto, and may also be implemented with a plurality of cameras. Meanwhile, the capturing unit 155 may be embedded in the image display device 100 above the display 180 or may be separately configured. Image information captured by the capturing unit 155 may be input to the controller 170.

The controller 170 may detect the user's gesture based on an image captured by the capturing unit 155 or signals detected by the sensor part (not illustrated) alone or in combination.

A remote control device 200 may transmit user input to the user input interface 150. To this end, the remote control device 200 may operate based on various communication standards such as Bluetooth, radio frequency (RF), infrared (IR), ultra wideband (UWB), ZigBee, etc. Also, the remote control device 200 may receive an image signal, an audio signal, or a data signal output from the user input interface 150 and output the corresponding signal as an image or voice.

Meanwhile, the image display device as set forth herein may include a TV receiver, a monitor, a portable phone, a smart phone, a laptop computer, a digital broadcast terminal, a personal digital assistant (PDA), a portable multimedia player (PMP), and the like. In addition, the image display device as set forth herein may be applied to a stationary terminal such as a digital TV, a desktop computer, a kiosk, a digital signage, etc. In particular, the electronic device described herein may be applied to a non-contact type display device, i.e., an image display device, such as a kiosk or a digital signage.

Meanwhile, the block diagram of the image display device 100 illustrated in FIG. 3 is simply illustrative. Depending on the specifications of the image display device 100 in actual implementation, the components of the image display device 100 may be combined or omitted or new components may be added. That is, two or more constituents may be combined into one component, or one component may be subdivided into two or more components, as needed. In addition, the function performed in each block is intended to explain an embodiment of the disclosure, and it should be noted that specific operations or devices of the blocks will not limit the scope of the disclosure.

Figure 4:
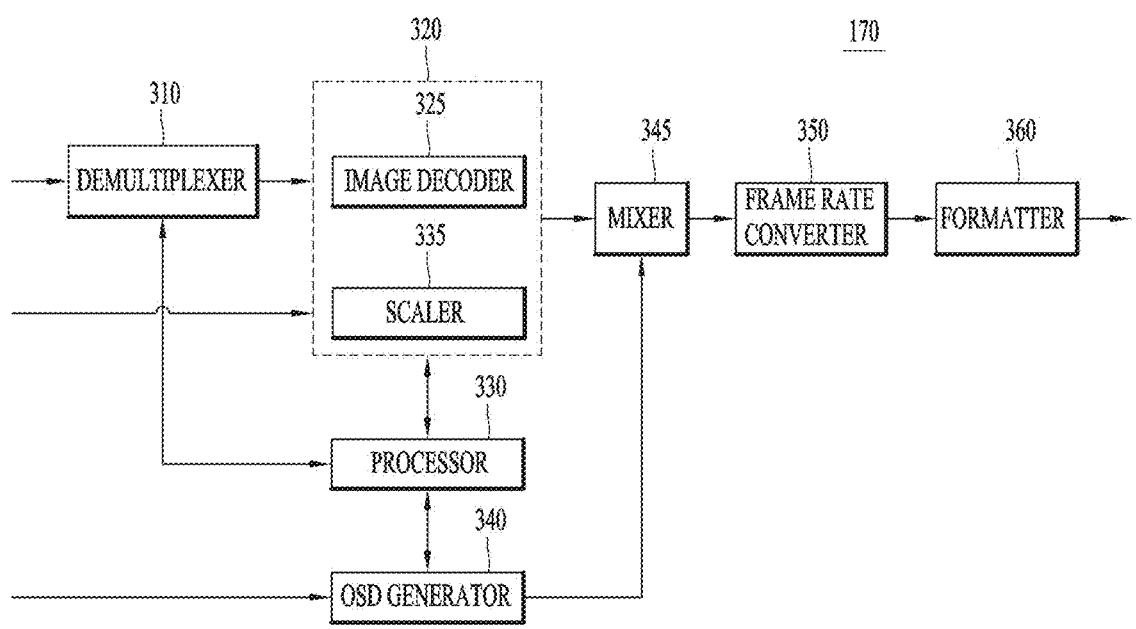
FIG. 4 is an internal block diagram of a controller of FIG. 3.

FIG. 4 is an internal block diagram of the controller of FIG. 3. Referring to FIG. 4, the controller 170 according to one embodiment may include a demultiplexer 310, an image processor 320, a processor 330, an OSD generator 340, a mixer 345, a frame rate converter 350, and a formatter 360. The controller 170 may further include an audio processor (not illustrated) and a data processor (not illustrated).

The demultiplexer 310 may demultiplex an input stream. For example, when MPEG-2 TS is input, the demultiplexer 310 may demultiplex the same to separate the stream into an image signal, a voice signal, and a data signal. Here, the stream signal input to the demultiplexer 310 may be a stream signal output from the tuner 110, the demodulator 120, or the external device interface 130.

The image processor 320 may perform image processing on a demultiplexed image signal. To this end, the image processor 320 may include an image decoder 225 and a scaler 235. The image decoder 225 may decode the demultiplexed image signal, and the scaler 235 may scale the resolution of the decoded image signal such that the image signal may be output through the display 180. The image decoder 225 may include decoders of various standards.

Meanwhile, image signals decoded in the image processor 320 may be classified into an image signal including only a 2D image signal, an image signal including a mixture of a 2D image signal and a 3D image signal, and an image signal including only a 3D image signal. For example, an external image signal received from the external device 190 or a broadcast image signal received from the tuner 110 may include only a 2D image signal, a mixture of a 2D image signal and a 3D image signal, and only a 3D image signal. Accordingly, such signals may be processed in the controller 170, for example, the image processor 320, such that a 2D image signal, a mixed signal of a 2D image signal and a 3D image signal, and a 3D image signal may be output, respectively.

Meanwhile, the image signal decoded in the image processor 320 may be a 3D image signal in various formats. For example, the decoded image signal may be a 3D image signal which includes a color image and a depth image, or a 3D image signal which includes a multi-viewpoint image signal. The multi-viewpoint image signal may include, for example, a left-eye image signal and a right-eye image signal.

Here, the formats of a 3D image signal may include a side-by-side format in which a left-eye image signal L and a right-eye image signal R are arranged left and right, a top-down format in which the left-eye image signal and the right-eye image signal are arranged top and bottom, a frame sequential format in which the left-eye image signal and the right-eye image signal are arranged in time division, an interlaced format in which the left-eye image signal and the right-eye image signal are mixed line by line, a checker box format in which the left-eye image signal and the right-eye image signal are mixed box by box, etc.

The processor 330 may control an overall operation within the image display device 100 or the controller 170. For example, the processor 330 may control the tuner 110 to tune in to an RF broadcast corresponding to a user-selected channel or a pre-stored channel.

The processor 330 may control the image display device 100 by a user command input through the user input interface 150 or an internal program. The processor 330 may also perform data transmission control with the network interface 135 or the external device interface 130.

The processor 330 may also control operations of the demultiplexer 310, the image processor 320, the OSD generator 340, etc. in the controller 170. The OSD generator 340 may generate an OSD signal based on user input or on its own. For example, the OSD generator 340 may generate a signal for display of various kinds of information in the form of graphic images or text on the screen of the display 180 based on a user input signal. The generated OSD signal may include various data such as user interface screens, a variety of menu screens, widgets, and icons of the image display device 100. The generated OSD signal may also include a 2D object or a 3D object.

The OSD generator 340 may also generate a pointer, which may be displayed on the display, based on a pointing signal received from the remote control device 200. In particular, the pointer may be generated by a pointing signal processor, and the OSD generator 240 may include the pointing signal processor (not illustrated). Alternatively, the pointing signal processor (not illustrated) may be provided separately from the OSD generator 340 without being included in the OSD generator 240.

The mixer 345 may mix the OSD signal generated by the OSD generator 340 and a decoded image signal processed by the image processor 320. In this instance, the OSD signal and the decoded image signal may each include at least one of a 2D signal and a 3D signal. The mixed image signal may be provided to the frame rate converter 350.

The frame rate converter FRC 350 may convert the frame rate of an input image. In some embodiments, the frame rate converter 350 may also output the frame rate as it is without converting the frame rate.

The formatter 360 may arrange a frame rate-converted 3D image. The formatter 360 may receive a mixed signal, that is, the OSD signal and the decoded image signal, from the mixer 345 and separate a 2D image signal and a 3D image signal from the mixed signal.

A 3D image signal as used herein may denote a signal including a 3D object, and examples of the object may include a picture in picture (PIP) image (still image or moving image), an EPG indicating broadcast program information, various menus, widgets, icons, text, things, persons, backgrounds, and web screens (newspaper, magazines, etc.) within an image, and so one.

The formatter 360 may change a format of a 3D image signal. For example, when a 3D image is input in one of the various formats described above, the formatter 360 may change the 3D image into a multi-viewpoint image. In particular, the formatter 360 may change the format of the 3D image such that the multi-viewpoint image is repeated. This enables a glassless-type 3D image to be displayed.

Meanwhile, the formatter 360 may also convert a 2D image signal into a 3D image signal. For example, according to a 3D image generation algorithm, the formatter 360 may detect an edge or a selectable object within a 2D image signal, separate an object according to the detected edge or the detected selectable object, and generate the object or the selectable object as a 3D image signal. The generated 3D image signal, as described above, may be a multi-viewpoint image signal.

Although not illustrated, a 3D processor (not illustrated) for processing a signal to exert a 3D effect may be further disposed at the end of the formatter 360. The 3D processor (not illustrated) may perform signal processing, for example, adjustment of brightness, tint, and color of an image signal, to improve the 3D effect.

For example, the audio processor (not illustrated) within the controller 170 may perform audio processing of a demultiplexed audio signal. To this end, the audio processor (not illustrated) may include various decoders. The audio processor (not illustrated) within the controller 170 may also adjust bass, treble, volume, etc.

The data processor (not illustrated) within the controller 170 may perform data processing on a demultiplexed data signal. For example, when the demultiplexed data signal is a coded data signal, the data processor may decode the data signal. The coded data signal may be electronic program guide (EPG) information which includes broadcast information such as the start time, the end time, and the like of a scheduled broadcast program of each channel.

Meanwhile, in FIG. 4, signals from the OSD generator 340 and the image processor 320 are mixed in the mixer 345 and then 3D-processed in the formatter 360, but the disclosure is not limited to this, and the mixer may alternatively be located behind the formatter. That is, the formatter 360 may perform 3D processing on an output signal of the image processor 320, the OSD generator 340 may generate an OSD signal and perform 3D processing on the OSD signal, and then the mixer 345 may mix the corresponding processed 3D signals.

Meanwhile, the block diagram of the image display device 170 illustrated in FIG. 4 is merely illustrative. Depending on the specifications of the controller 170 in actual implementation, the components of the controller 170 may be combined or omitted or new components may be added. In particular, the frame rate converter 350 and the formatter 360 may not be disposed within the controller 170 but may be separately provided.

Hereinafter, a description will be given of a method for displaying a 3D display in an electronic device according to an embodiment, for example, in a display device such as an image display device. In some embodiments, a method for improving a viewing angle in a floating 3D display device will be described. A floating 3D display device may be, but is not limited to, an electronic device, for example, a 3D kiosk which displays a 3D display.

Figure 5:
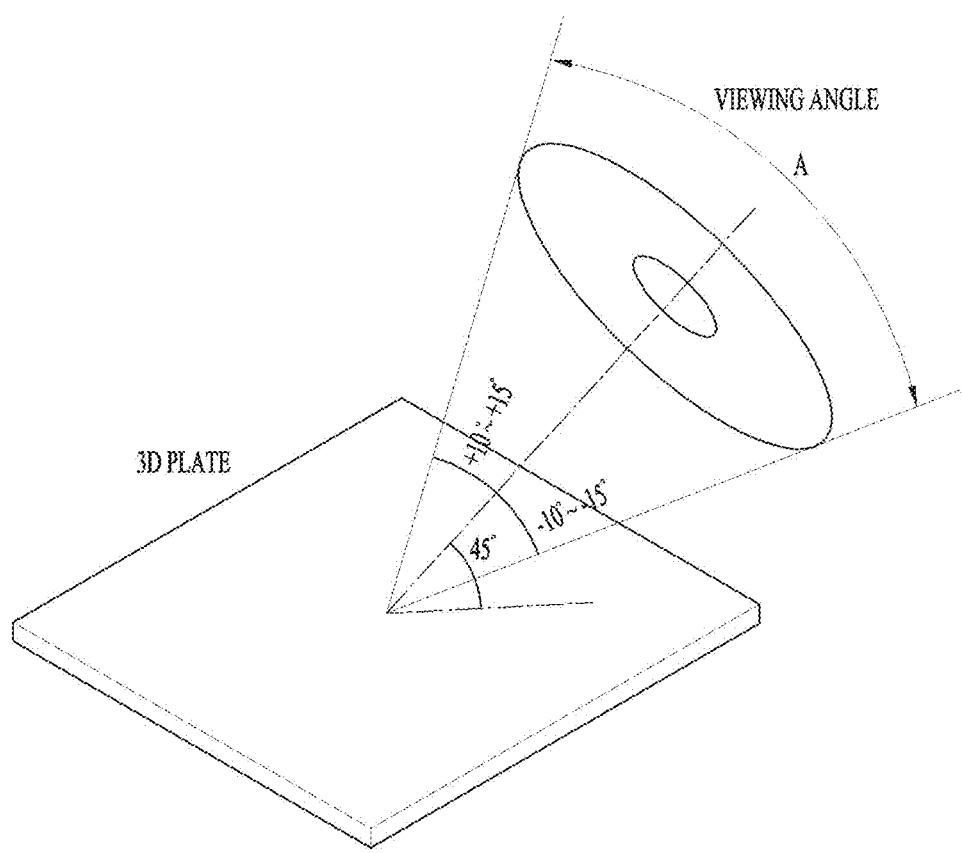
FIG. 5 is a conceptual diagram illustrating a viewing angle of a user who views a floating image according to the disclosure.

Meanwhile, FIG. 5 is a conceptual diagram illustrating a viewing angle of a user who views a floating image according to the disclosure. Referring to FIG. 5, the optical characteristic (viewing angle) of a 3D plate of a display, which outputs a 3D display, may vary depending on the dimensions of the 3D plate. As the 3D plate is disposed, the user's viewing angle may be limited in an up-down (vertical) direction. For example, when the 3D plate is 20 cm×20 cm, the user's viewing angle may be limited to a range of about −15 degrees to +15 degrees.

Accordingly, the user's viewing angle may be limited when the user changes a posture in which the user views an image from a standing posture to a sitting posture or from the sitting posture to the standing posture. Further, because each user has different heights when the user is sitting and standing, an upper/lower portion of an original image associated with a floating 3D image may be partially invisible. Accordingly, image information on the partially-invisible (cut-off) portion of the original image may be lost and a problem such as visual dizziness may occur. Hereinafter, a description will be given in detail of an electronic device for displaying a floating image according to the disclosure for solving these problems, with reference to the drawings.

Figure 6:
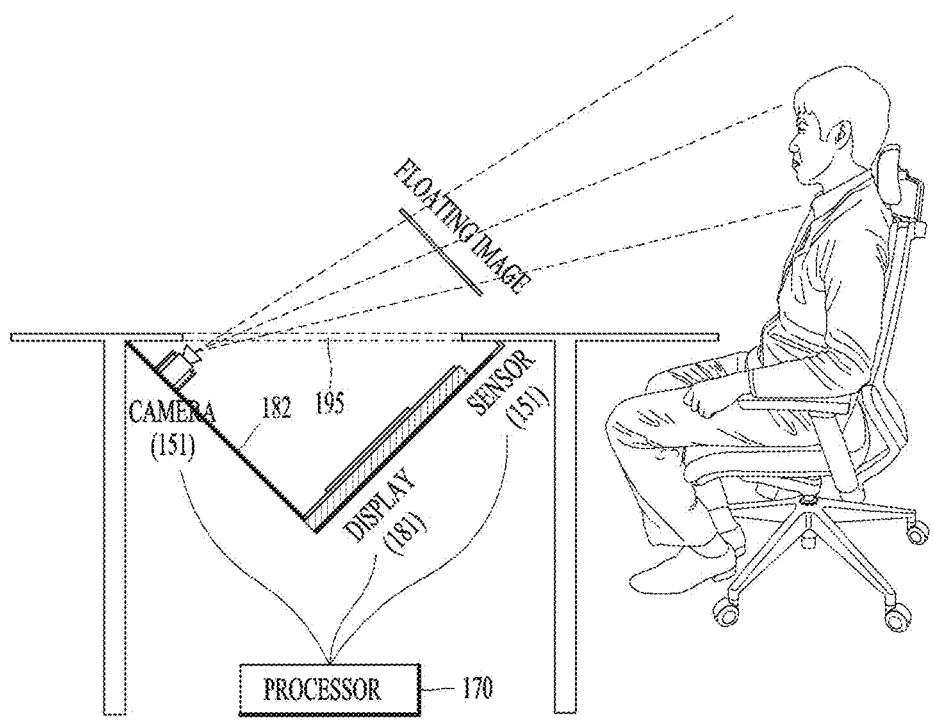
FIG. 6 illustrates the configuration of an electronic device (electronic equipment) for displaying a floating image according to the disclosure.

FIG. 6 illustrates the configuration of an electronic device (electronic equipment) for displaying a floating image according to the disclosure. Referring to FIG. 6, the electronic device may track a user's gaze and render a floating image so that a display position of the floating image is regenerated in a vertical (up-down) direction to be appropriate for a viewing position. In this regard, the electronic device may be configured to set the display position of the floating image so that the floating image does not deviate from the user's viewing angle in the vertical direction. The floating image may be a holographic image, but is not limited thereto. The floating image may be referred to as a 3D image, a holographic image, a 3D floating image, a 3D holographic image, a floating holographic image, or a 3D floating holographic image.

An aspect of the disclosure is to solve the problem that an image is partially cut off depending on a viewing angle in an electronic device (electronic equipment) for displaying a floating image. Another aspect of the disclosure is to propose various methods for improving a narrow vertical (up-down) viewing angle of a floating 3D kiosk.

Another aspect of the disclosure is to restore an original image by changing an image display area when a portion of an image is cut off according to a user's viewing angle. Another aspect of the disclosure is to provide user guidance (UX/UI) when a user's viewing angle exceeds a vertical movement range. Another aspect of the disclosure is to secure a sufficient vertical viewing angle by tracking a user's gaze and regenerating an image accordingly.

In order to achieve these aspects, a method for displaying a floating image in an electronic device for displaying a floating image according to the disclosure may be implemented in a manual mode and an automatic mode. Referring to FIGS. 5 and 6, a viewing angle of a user who views a floating image may be limited to a range of about −10 degrees to +10 degrees or to a range of about −15 degrees to +15 degrees. For example, when the 3D plate is 20 cm×20 cm, the user's viewing angle may be limited to the range of about −15 degrees to +15 degrees.

In a manual mode, 1) when a viewing position is within a vertical (up-down) viewing angle range based on viewer's eyes (user's eyes), only a floating image may be visible and a guide image may be invisible. 2) When the viewing position is moved upward (about +15 degrees), a lower portion of the floating image may be cut off and a guide image indicating a guide direction toward a top may be displayed on an upper area. 3) When the viewing position is moved downward (about −15 degrees), an upper portion of the floating image may be cut off and a guide image indicating a guide direction toward a top may be displayed on a lower area.

In an automatic mode, 1) when a viewing position is located within a vertical viewing angle based on viewer's eyes, a rendering position of a floating image on the display may be determined as a central area. 2) When the viewing position is moved upward (about +15 degrees), the rendering position of the floating image on the display may change to an upper area as illustrated in FIG. 8B. Accordingly, even when the viewing position is moved upward, the floating image may be displayed as a normal image, as illustrated in FIG. 6B, rather than having the lower portion cut off. 3) When the viewing position is moved downward (about −15 degrees), the rendering position of the floating image on the display may change to a lower area as illustrated in FIG. 8C. Accordingly, even when the viewing position is moved downward, the floating image may be displayed as a normal image, as illustrated in FIG. 6C, rather than having the upper portion cut off.

Referring to FIG. 5, the electronic device 100 may include a display 181, an inner plate 182, and a 3D plate 195. The electronic device may include a sensor module 151 and a camera 155.

The sensor module 151 may be configured to recognize the user's touch input on a floating region where a floating image is displayed. The camera 155 may be configured to recognize the user's gaze and track the gaze.

The display 181 may be configured to display a floating image to float thereabove at a spacing. The display 181 may be configured so that the floating image is displayed to float above the display 181 at a predetermined height from a horizontal plane of the display 181.

The inner plate 182 may be coupled to the display 181 and disposed parallel to a plane above which the floating image is displayed. The display 181 may be configured to provide a certain 3D image, and the inner plate 182 may be configured to provide a background screen for the 3D image. The display 181 and the inner plate 182 may be disposed perpendicular to each other. The 3D plate 195 may be positioned to be tilted at a certain angle relative to the display 181 and a second display 10b.

A 3D image provided from the display 181 may be transmitted through the 3D plate 195 to be displayed as a floating image in front of the inner plate 182, particularly, in front of the 3D plate 195. The display 181 and the inner plate 182 may be positioned inside the 3D plate 195. The 3D plate 195 may be configured so that the floating image is displayed thereabove at a certain inclination angle. The floating image may be formed at the front of the 3D plate 195 to be perpendicular to the display 181 and horizontal relative to the inner plate 182.

The camera 155 may be positioned to change a display position of a floating image depending on the user's viewing angle. The camera 155 may be disposed inside the 3D plate 195. The camera 155 may be disposed on an upper area of the inner plate 182, in an inner area of the 3D plate 195, but is not limited thereto. The camera 155 may be configured to track the user's gaze outside the 3D plate 195. The camera 155 may also be configured to track the user's gaze when a floating region where the floating image is displayed deviates from a certain range.

The electronic device according to the specification may display a floating image within an active region of the display 181. In this regard, an area where a floating image is displayed may be determined by considering the user's vertical viewing angle range. The active region of the display 181 may be larger than a floating region where a floating image is displayed.

The electronic device according to the specification may further include a processor 170 to control an area in which a floating image is displayed. The processor 170 may be disposed in the electronic device or implemented as a separate processing device. The processor 170 may be operably coupled to the camera 155. The processor 170 may control the floating region to be moved upward or downward based on a tracked gaze.

The floating region and the active region of the display will be described with reference to the drawings. In this regard, the display position of the floating image within the display area may change depending on the user's field of view. Accordingly, the floating image may be displayed with at least a partial area cut off. In relation to this, FIGS. 7A to 7C illustrate that a floating image is displayed in a partially cut-off state according to a change in viewing position.

Figure 7A:
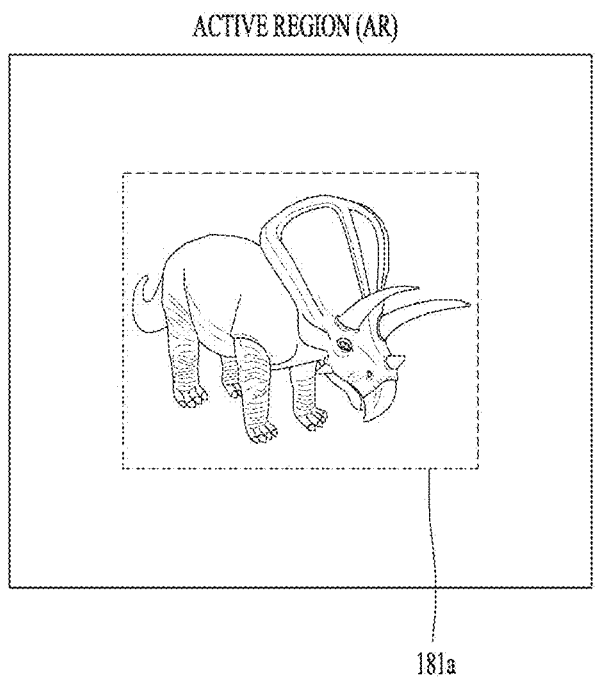
FIGS. 7A to 7C illustrate that a floating image is displayed with at least a partial area cut off according to a change in viewing position.

Referring to FIG. 7A, when a viewer's viewing position is located within a vertical viewing angle, a floating region 181a where a floating image is displayed may be disposed within an active region AR of the display. Accordingly, only the floating image may be displayed within the active region of the display, and no guide image regarding the position of the floating image may be displayed. The active region AR of the display may be represented as a maximum area corresponding to a maximum pixel size on which the floating image may be displayed. In this regard, the active region AR of the display may correspond to an area (size) (or a certain ratio) of the display 181 of FIG. 6. The active region AR of the display may correspond to an area (or a certain ratio) of the inner plate 182 of FIG. 6.

Figure 7B:
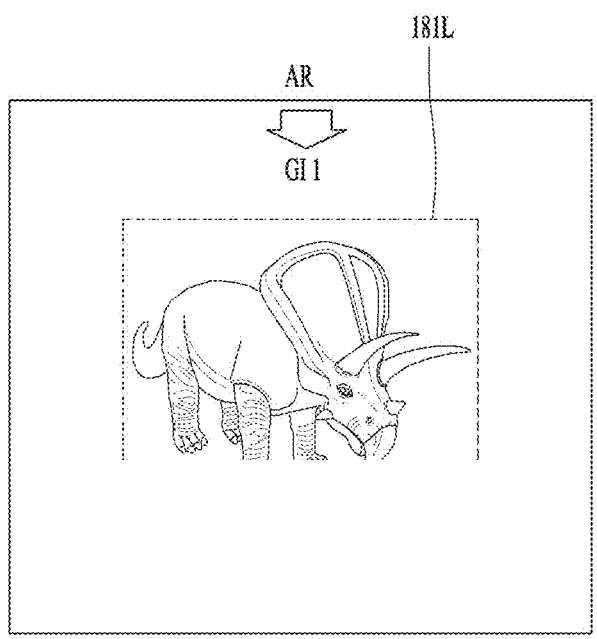
Figure 7C:
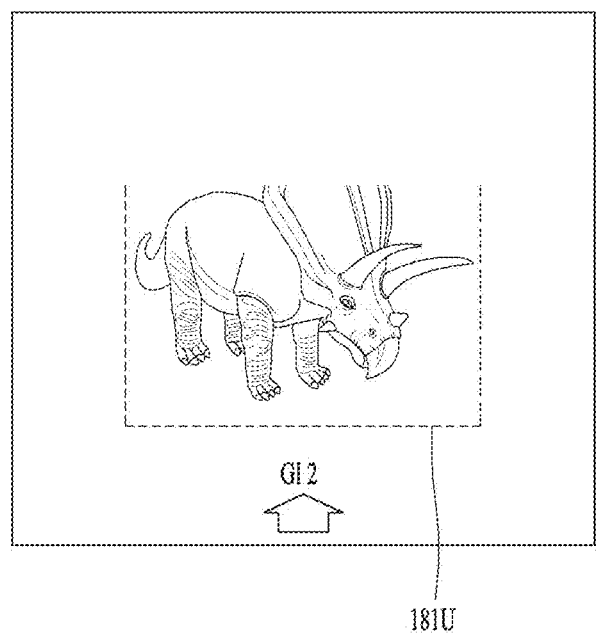

Referring to FIG. 7B, as the viewer's viewing position is moved upward, a floating region 181L may be displayed with a lower portion partially cut off. For example, as the viewer's viewing position changes by about +15° or more, the floating region 181L may be displayed with a lower portion partially cut off. Accordingly, a floating image with a lower portion partially cut off may be displayed within the active region of the display, and a first guide image Gl1 may be displayed in an upper area.

When the first guide image Gl1 is touched, the floating region 181L may be moved upward. Accordingly, as illustrated in FIG. 8B, the floating region 181b may be displayed in an upper area of the active region of the display, and the lower portion of the floating image may be displayed normally within the floating region 181b without being cut off. As another example, the first guide image Gl1 may be an image that guides the user's gaze to change in a downward direction, so that the floating region may be displayed normally without being cut off. Accordingly, when the user's viewing position is moved downward, the floating region 181a may be displayed in the central area of the active region of the display, as illustrated in FIG. 6A.

Referring to FIG. 7C, as the viewer's viewing position is moved downward, the floating region 181U may be displayed with an upper portion partially cut off. For example, the floating region 181U may be displayed with the upper portion partially cut off as the viewer's viewing position is changed by about −15° or more. Accordingly, the floating image with an upper portion partially cut off may be displayed within the active region of the display, and a second guide image Gl2 may be displayed in a lower area.

When the second guide image Gl2 is touched, the floating region 181U may be moved downward. Accordingly, as illustrated in FIG. 8C, the floating region 181b may be displayed in a lower area of the active region of the display, and the upper portion of the floating image may be displayed normally within the floating region 181b without being cut off. As another example, the second guide image Gl2 may be an image that guides the user's gaze to change in an upward direction, so that the floating region may be displayed normally without being cut off. Accordingly, when the user's viewing position is moved upward, the floating region 181a may be displayed in the central area of the active region of the display, as illustrated in FIG. 7A.

Meanwhile, different guide images may be displayed in the upper, lower, left, and right areas of a floating region where a floating image is displayed. In this regard, FIG. 8 illustrates a screen configuration in which different guide images are displayed in the upper, lower, left, and right areas of a floating region where a floating image is displayed.

Figure 8:
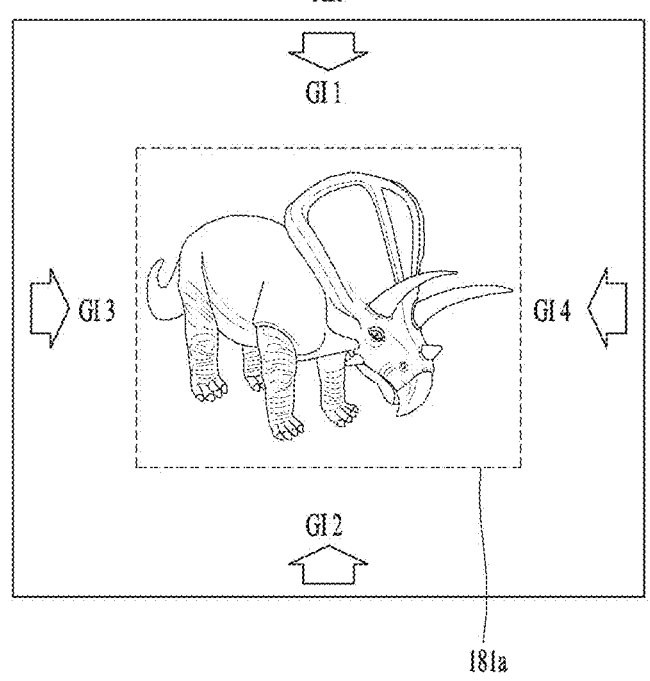
FIG. 8 illustrates a screen configuration in which different guide images are displayed in the upper, lower, left, and right areas of a floating region where a floating image is displayed.

Referring to FIG. 8, first through fourth guide images Gl1, Gl2, Gl3, and Gl4 may be displayed within the active region AR of the display, in addition to the floating region 181a of the floating image. The first to fourth guide images Gl1, Gl2, Gl3, and Gl4 may be displayed in corresponding directions of the user's view. When the user's view deviates from the viewing angle, a user guide image appropriate for a corresponding direction may appear, and the user may change and adjust the viewing angle/direction according to the displayed guide image.

Hereinafter, a description will be given of operations in an electronic device that displays a floating image according to the specification, with reference to FIGS. 6 to 8. The processor 170 may determine whether a portion, i.e., the lower portion, of the floating image is not displayed as a gaze is moved upward. For example, the processor 170 may determine whether the portion, i.e., the lower portion, of the floating image is not displayed, as the floating region is moved downward within the active region, in response to the upward movement of the gaze.

When it is determined that the lower portion as the portion of the floating image is not displayed, the processor 170 may control a guide image Gl1 to be displayed in the upper area of the floating image. Further, the processor 170 may control the display 180 so that the floating region is moved upward.

The processor 170 may determine whether a portion, i.e., the upper portion, of the floating image is not displayed as the gaze is moved upward. For example, the processor 170 may determine whether the portion, i.e., the upper portion, of the floating image is not displayed, as the floating region is moved downward within the active region, in response to the upward movement of the gaze.

When it is determined that the upper portion as the portion of the floating image is not displayed, the processor 170 may control a guide image Gl2 to be displayed in the lower area of the floating image. The processor 170 may control the display 180 so that the floating region is moved downward.

The processor 170 may also determine whether the gaze is moved in the left-right direction as well as in the vertical direction. The processor 170 may determine whether the floating region is moved to the right or left within the active region, in response to the left or right movement of the gaze. The processor 170 may then determine whether a portion of the floating image is not displayed as the floating region is moved to the right or left within the active region.

When it is determined that the left or right portion as a portion of the floating image is not displayed, the processor 170 may control a guide image Gl4 or Gl3 to be displayed in the left or right area of the floating image. The processor 170 may control the display 180 so that the floating region is moved in the right or left direction.

The floating region and the active region of the display will be described with reference to the drawings. In this regard, FIGS. 9A to 9C illustrate an active region and a floating region of a display according to a user's viewing position.

Figure 9A:
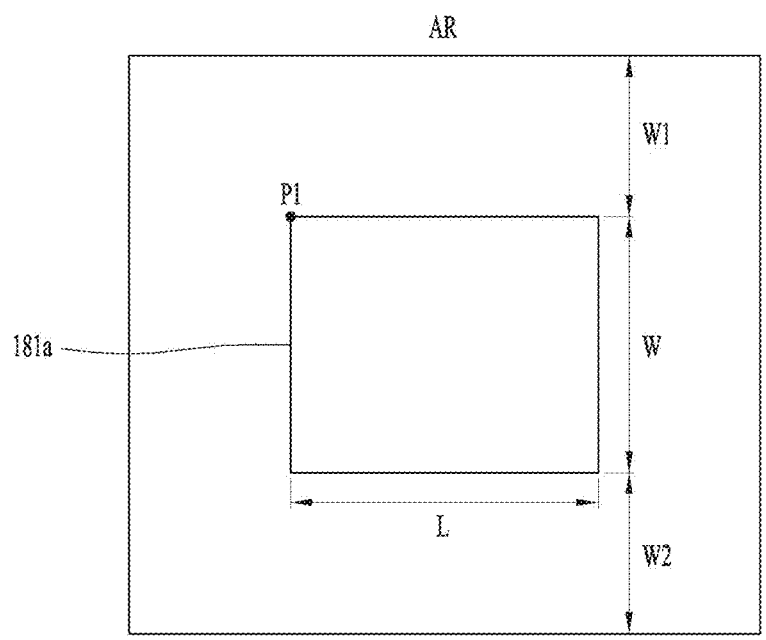
FIGS. 9A to 9C illustrate an active region and a floating region of a display according to a user's viewing position.

Referring to FIG. 6 and FIG. 9A, the viewing position based on the viewer's eyes is shown as being located within the vertical viewing angle. A rendering location of the floating image may be the central area of the inner plate 182. For example, the active region AR of the display 181 may be formed with a size of 1920×1080 pixels. The floating region 181a of the floating image may be formed with a size of 960×540 pixels. In this regard, a starting position P1 of the floating region 181a may be determined as (320, 270). The floating region 181a where the floating image is displayed may be the central area in the active region AR. For example, the length L and width W of the floating region 181a may be set to 146.74 mm and 82.54 mm, respectively, but are not limited thereto. A width W1 between the top of the active region AR and the top of the floating region 181a may be set to 41.26 mm, but is not limited thereto. A width W2 between the bottom of the active region AR and the bottom of the floating region 181a may be set to 41.26 mm, but is not limited thereto.

Figure 9B:
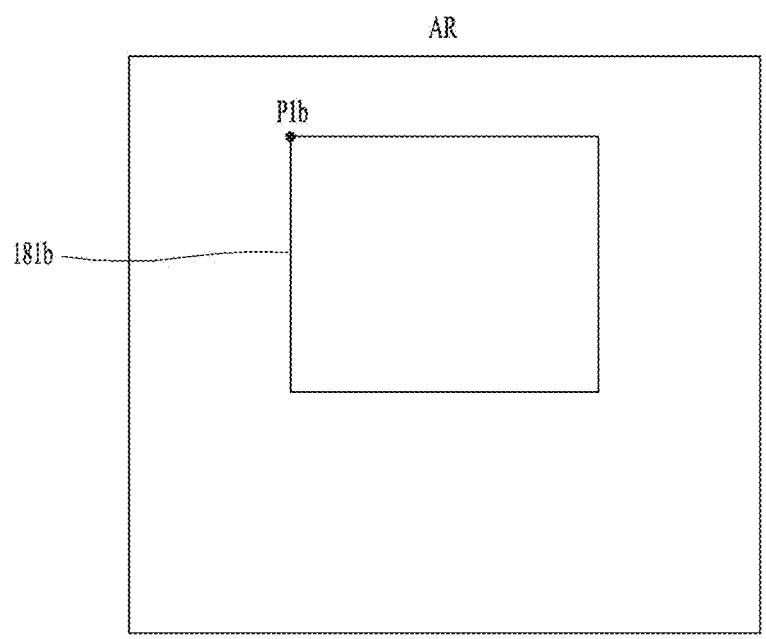
Figure 9C:
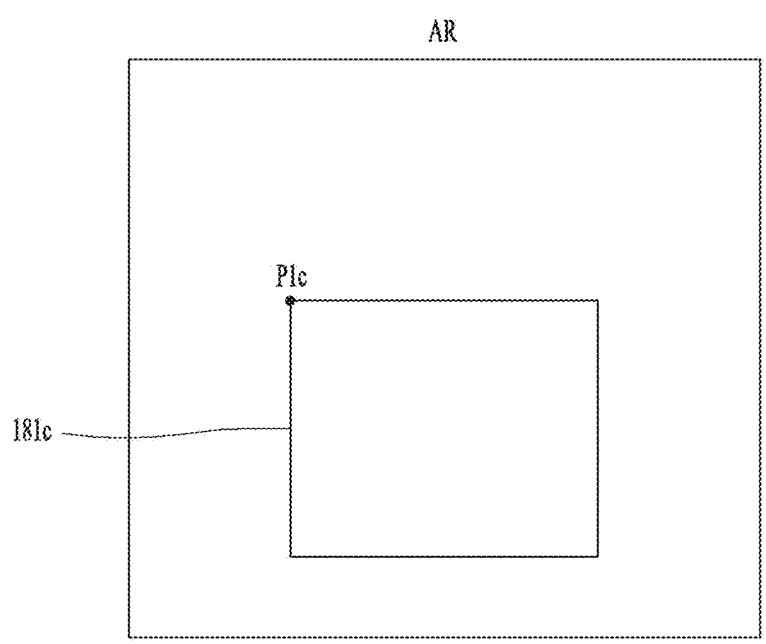

Referring to FIG. 6 and FIG. 9B, the viewing position based on the viewer's eyes is shown as having moved upward. For example, when the viewing position is changed by about +10°, the rendering position of the floating image may be an upper area of the inner plate 182. In another example, when the viewing position is changed by about +15 degrees or more, the floating region 181L may be displayed with the lower portion cut off, as illustrated in FIG. 6B. As described above, the active region of the display 181 may be formed with a size of 1920×1080 pixels. The floating region of the floating image may be formed with a size of 960×540 pixels. In this regard, a starting position P1b of the floating region 181b may be determined as (320, 100). The floating region 181b where the floating image is displayed may be the upper area in the active region AR. Accordingly, even when the viewing position is moved upward, the floating image displayed in the floating region 181b may be displayed normally without the lower portion being cut off.

Referring to FIG. 6 and FIG. 9, the viewing position based on the viewer's eyes is shown as having moved downward.

For example, when the viewing position is changed by about −10°, the rendering position of the floating image may be a lower area of the inner plate 182. In another example, when the viewing position is changed by about −15 degrees or more, the floating region 181D may be displayed with the upper portion cut off, as illustrated in FIG. 6C. As described above, the active region of the display 181 may be formed with a size of 1920×1080 pixels. The floating region of the floating image may be formed with a size of 960×540 pixels. In this regard, a starting position P1c of the floating region may be determined as (320, 440). The floating region 181c where the floating image is displayed may be the lower area in the active region AR. Accordingly, even when the viewing position is moved downward, the floating image displayed in the floating region 181c may be displayed normally without the upper portion being cut off.

Meanwhile, the method for controlling the floating region based on gaze tracking according to the specification may compensate for the viewing position so that the floating region is always placed in the central area as illustrated in FIGS. 7A, 8, and 9A.

Referring to FIGS. 6, 9B, and 9C, when it is determined that the floating region is to be moved downward within the active region as the gaze is moved upward, the processor 170 may control one point of the floating region to be moved upward. In this regard, as the gaze is moved upward, the starting position of the floating region may be moved downward to (320, 440) as in FIG. 8C. The processor 170 may control the starting position of the floating region to be moved upward to (320, 100) as illustrated in FIG. 8B. Accordingly, the finally corrected starting position of the floating region may be (320, 270) as illustrated in FIG. 9A, and thus may always be placed in the central area of the floating region.

In another example, when it is determined that the floating region is to be moved upward within the active region as the gaze is moved downward, the processor 170 may control one point of the floating region to be moved downward. In this regard, as the gaze is moved downward, the starting position of the floating region may be moved upward to (320, 100) as in FIG. 9B. The processor 170 may control the starting position of the floating region to be moved downward to (320, 440) as in FIG. 8C. Accordingly, the finally corrected starting position of the floating region may be (320, 270) as in FIG. 9A, and thus may always be placed in the central area of the floating region.

Hereinafter, the technical features and utilizations of an electronic device for displaying a floating image and a control method thereof according to the specification will be described. These technical features may constitute independent claims of an electronic device for displaying a floating image, a display device, and a control method thereof according to the specification.

Referring to FIG. 6, the camera 151 configured to track the user's gaze in the floating 3D display device may be provided. The camera 151 may be installed inside the 3D plate 195 so that the area where the floating image is displayed may be optimally configured based on the change in gaze position.

Referring to FIG. 8, the floating region 181a in which the floating image is realized may be displayed within the active region AR of the display, and the guide image Gl1, Gl2, Gl3, Gl4 may be displayed in the up/down or left/right direction based on the user's gaze direction. Accordingly, when viewing 3D content including the floating image, at least one of various forms of different guide images Gl1, Gl2, Gl3, and Gl4 may be displayed as the viewing direction changes.

Referring to FIGS. 9A to 9C, it may be confirmed on the screen that the floating region 181a where the floating image is displayed is moved upward or downward, and the position of the image changes accordingly. When the viewing position is located within the viewing angle range as illustrated in FIG. 9A, the floating region 181a may be displayed in the central area of the active region AR of the display. When the viewing position is moved upward outside the viewing angle range as in FIG. 9B, the floating region 181b may be displayed in the upper area of the active region AR of the display. Accordingly, even when the viewing position is outside the viewing angle range, the lower portion of the floating image may be displayed normally without being cut off. When the viewing position is moved downward outside the viewing angle range as in FIG. 8C, the floating region 181b may be displayed in the lower area of the active region AR of the display. Accordingly, even when the viewing position is outside the viewing angle range, the upper portion of the floating image may be displayed normally without being cut off.

Meanwhile, a method for controlling a floating region based on gaze-tracking according to the specification may be implemented through eye tracking in an eye tracking block and eye position-based image regeneration in a video processor. In this regard, FIG. 10 is a block diagram of an electronic device that performs a method of controlling a floating region based on gaze tracking according to the disclosure.

Figure 10:
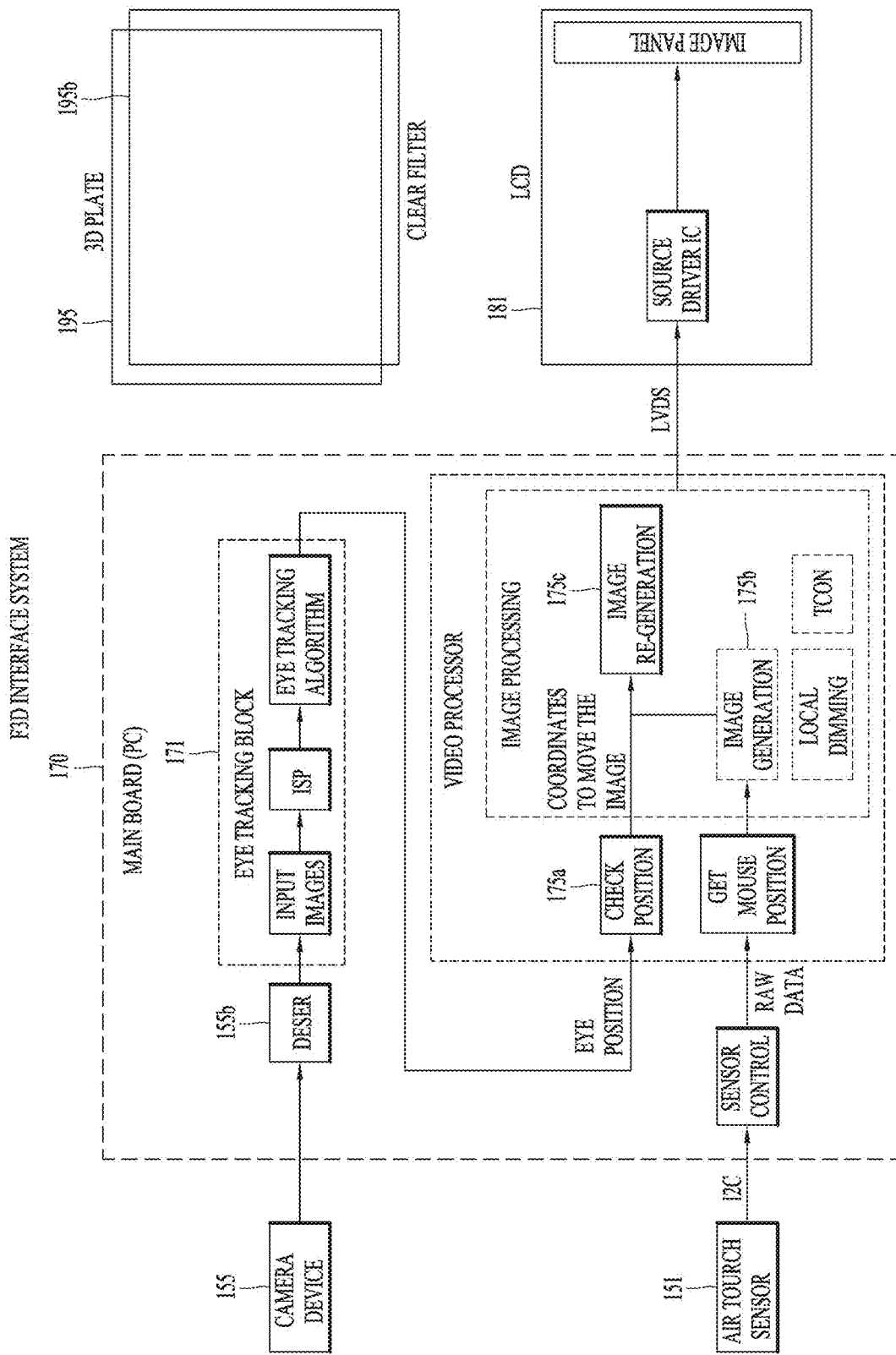
FIG. 10 is a block diagram of an electronic device that performs a method of controlling a floating region based on gaze tracking according to the disclosure.

Referring to FIGS. 6 and 10, a processor 170 may include a sensor module 151 and a camera 155. The sensor module 151 may be configured to recognize a user's touch input on a floating region where a floating image is displayed. The sensor module 151 may be coupled with a sensor controller 151b, and the camera 155 may be coupled with a converter 155b. The converter 155b may be configured to convert a serialized signal acquired from the camera 155 into a parallel signal. Therefore, the converter 155b may also be referred to as a de-serializer DESER.

The processor 170 may be configured in the form of a main board and disposed inside a 3D plate 195. The processor 170 may be operably coupled to a display 181. The processor 170 may control an image to be displayed on the display 181 through a driver IC 181b. The 3D plate 195 may be disposed on the upper area of the display 181, and the processor 170 may control a floating image to be displayed in the upper area of the display 181. A filter 195b may be disposed in the upper area of the 3D plate 195 to remove 3D noise of the floating image.

The processor 170 may include an eye tracking block 171 and a video processor 175. The video processor 175 may include a position check block 175a, an image generation block 175b, and an image regeneration block 175c.

The eye tracking block 171 may be configured to execute image signal processing (ISP) and an eye tracking algorithm on an input image from the camera. The position check block 175a may determine whether a partial area of a floating image is visible without being cut off, based on the user's eye position acquired from the eye tracking block 171.

The image generation block 175b may generate a floating image so that the floating image is displayed at the corresponding position. The image generation block 175b may generate a floating image so that the floating image is displayed at a corresponding position according to the user's touch input and/or tracked gaze coordinates. The image regeneration block 175c may be configured to receive information on coordinates, to which the floating image is to be moved, from the position check block 175*a*. The image regeneration block 175*c* may regenerate the floating image into a second floating image so that the display position of the floating image is changed based on information on the coordinates to which the floating image is to be moved.

In the method for controlling the floating region based on the eye tracking, the processor 170 may interoperate with the camera 155 for eye tracking. The processor 170 may be interfaced with the sensor module 151 and the camera 155 via interface hardware. Eye tracking algorithm software may be executed in the eye tracking block 171. When the user's eye position is transmitted through the eye tracking block 171, the position check block 175*a* may determine whether the floating image is visible without being cut off within the active region of the display. Based on the output of the position check block 175*a*, the image regeneration block 175*c* may receive coordinates, to which the floating image is to be moved in the up-down (vertical) direction, and regenerate a second floating image by reflecting the coordinates on an original image.

In a method for controlling a floating region based on gaze tracking according to the specification, a user's gaze and/or a cut-off state of a floating image may be determined based on a rendering start position. In this regard, FIG. 11 illustrates a screen configuration according to a method of controlling a floating region based on gaze tracking according to the disclosure.

Figure 11:
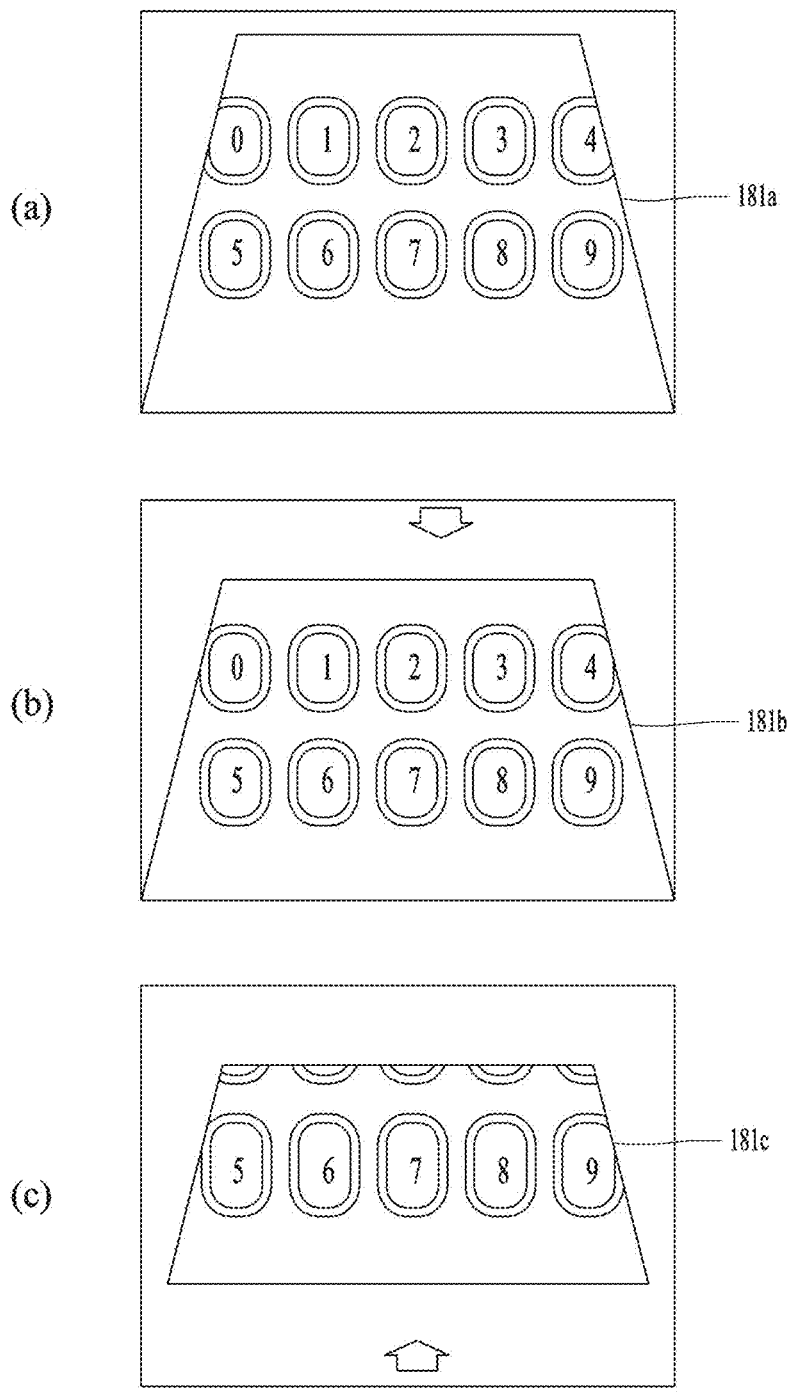
FIG. 11 illustrates a screen configuration according to a method of controlling a floating region based on gaze tracking according to the disclosure.

Referring to (a) of FIG. 11, when a viewing position is located within a vertical viewing angle range, a floating region 181*a* of a floating image may be displayed within an active region of a display. Referring to (b) of FIG. 10, when the viewing position is moved upward, the floating region 181*b* of the floating image may be moved downward and a guide image may be displayed in an upper area. In (b) of FIG. 11, the lower portion of the floating region 181*b* is not cut off, but a partial area of the lower portion of the floating region 181*b* may be cut off when the viewing position is moved further upward. Referring to (c) of FIG. 11, when the viewing position is moved downward, the floating region 181*c* of the floating image may be moved upward and a guide image may be displayed in a lower area.

In this regard, referring to FIGS. 6 to 11, the processor 170 may display the floating image when it is determined that the gaze belongs to the vertical viewing angle range. The processor 170 may detect coordinates of a rendering start position, which is the position of a lower portion where the floating image is to be rendered. The processor 170 may determine whether the gaze is moved upward and whether a lower portion of the floating image is cut off, based on the coordinates of the rendering start position. The processor 170 may determine whether the gaze is moved upward and whether the lower portion of the floating image is cut off, based on the coordinates of the rendering start position of the floating image and the size information on the floating image.

The processor 170 may display the floating image when it is determined that the gaze belongs to the vertical viewing angle range. When it is determined that the gaze is moved upward beyond the vertical viewing angle range, the processor 170 may control a guide image to be displayed in the upper area of the floating image. When it is determined that the gaze is moved downward beyond the vertical viewing angle range, the processor 170 may control a guide image to be displayed in the lower area of the floating image.

In a method for controlling a floating region based on gaze tracking according to the specification, the changed floating region may change back to its original position based on a perpendicular direction of a viewing angle and gaze position tracking. In this regard, FIG. 12 is a conceptual diagram illustrating that a floating region, which has been moved according to the change in viewing angle, is moved back to an original position based on gaze position tracking.

Figure 12:
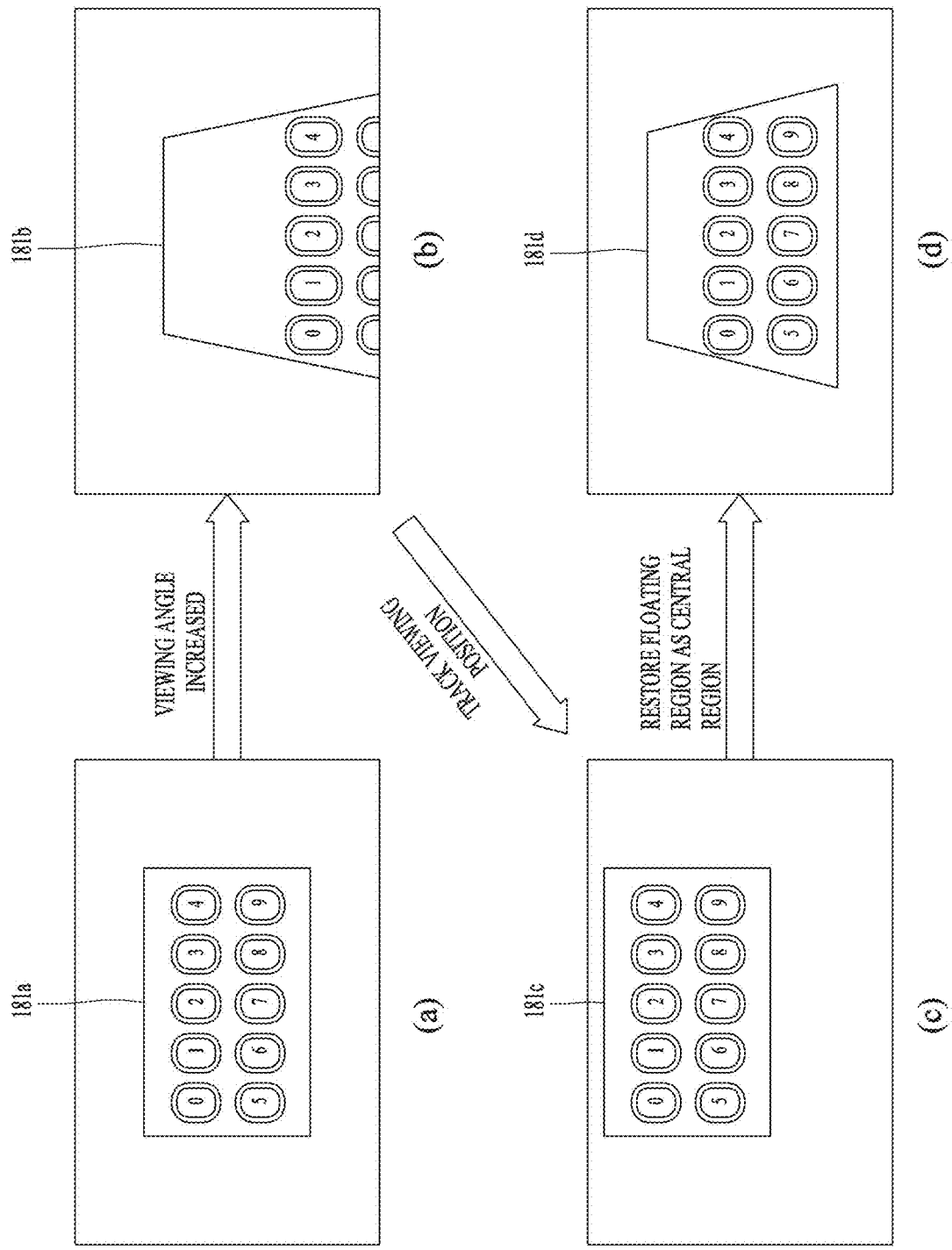
FIG. 12 is a conceptual diagram of changing a floating region, which has changed according to a change in viewing angle, to an original position based on gaze position tracking.

Referring to (a) of FIG. 12, a floating region 181*a* of a floating image may be displayed in the central area of the active region of the display. Referring to (b) of FIG. 12, when the viewing angle increases in the perpendicular direction, the floating region 181*b* of the floating image may be displayed in the lower area of the active region of the display. Referring to (c) of FIG. 12, when the viewing position has been moved upward by gaze position tracking, the floating region 181*c* of the floating image may be moved to the upper area of the active region of the display. Referring to (d) of FIG. 12, as the floating region is moved based on the gaze position, the floating region 181*d* of the floating image may be moved back to its original position, which is the central area of the active region of the display. Accordingly, the floating region may be restored to its normal position, which is the central area of the active region of the display, as illustrated in (a) of FIG. 12.

Referring to FIGS. 6 to 12, the processor 170 may display the floating image when it is determined that the gaze belongs to the vertical viewing angle range. The processor 170 may determine whether the gaze is moved upward in the state where the lower portion of the floating image has been cut off. When the gaze is moved upward, the processor 170 may render a floating image 181*b* into a second floating image 181*d* so that the floating image is moved upward. The second floating image 181*d* may be a normal image which is displayed within the active region and in which the gaze is within the vertical viewing angle range.

The processor 170 may display a floating image when it is determined that the gaze belongs to the vertical viewing angle range. The processor 170 may determine whether the gaze is moved downward in the state where the upper portion of the floating image has been cut off. When the gaze is moved downward, the processor 170 may render the floating image into a third floating image so that the floating image is moved downward. The third floating image may be a normal image which is displayed within the active region and in which the gaze is within the vertical viewing angle range.

Meanwhile, in a method for controlling a floating region based on gaze tracking according to the specification, a floating image which is displayed in a state where a partial area of an upper portion or lower portion has been cut off may be changed in position to be displayed or may be normally displayed again according to the change in gaze.

Hereinafter, a description will be given of an exemplary embodiment, in which an upper portion of a floating image, which has been partially cut off, is restored according to a gaze movement, with reference to FIGS. 6 to 12. The processor 170 may receive information on second coordinates, to which a floating image is to be moved, through the position check block 175*a*. The processor 170 may determine whether the gaze is moved downward and whether an upper portion of a second floating image has been cut off based on the coordinates of a rendering start position of the second floating image to be regenerated through the image regeneration block 175*c*.

When it is determined that the upper portion of the second floating image has been cut off, the processor 170 may receive information on third coordinates, to which the second floating image is to be moved, through the position check block 175*a* according to the upward movement of the gaze. The processor 170 may display a third floating image within the active region through the image regeneration block 175c based on the information on the third coordinates to which the second floating image is to be moved. Therefore, the second floating image with its upper portion cut off may be displayed normally again as the third floating image according to the change in gaze. The third floating image may be displayed in a higher area within the active region than the second floating image. The rendering start position of the third floating image may be displayed in a higher area within the active region than the rendering start position of the second floating image.

Hereinafter, a description will be given of an exemplary embodiment, in which a lower portion of a floating image, which has been partially cut off, is restored according to a gaze movement, with reference to FIGS. 6 to 12. The processor 170 may receive information on second coordinates to which a floating image is to be moved through the position check block 175a. The processor 170 may determine whether the gaze is moved upward and whether an upper portion of a second floating image has been cut off based on the coordinates of a rendering start position of the second floating image to be regenerated through the image regeneration block 175c.

When it is determined that the lower portion of the second floating image has been cut off, the processor 170 may receive information on third coordinates, to which the second floating image is to be moved, through the position check block 175a according to the downward movement of the gaze. The processor 170 may display a third floating image within the active region through the image regeneration block 175c based on the information on the third coordinates to which the second floating image is to be moved. Therefore, the second floating image with its lower portion cut off may be displayed normally again as the third floating image according to the change in gaze. The third floating image may be displayed in a lower area within the active region than the second floating image. The rendering start position of the third floating image may be displayed in a lower area within the active region than the rendering end position of the second floating image.

Meanwhile, in a method for controlling a floating region based on gaze tracking according to the specification, a floating image which is displayed in a state where a partial area of an upper portion or lower portion has been cut off may also be displayed in a scale-down manner.

Hereinafter, a description will be given of an exemplary embodiment, in which an upper portion of a floating image, which has been partially cut off, is restored according to a gaze movement, with reference to FIGS. 6 to 12. The processor 170 may receive information on second coordinates to which a floating image is to be moved through the position check block 175a. The processor 170 may determine whether the gaze is moved downward and whether an upper portion of a second floating image has been cut off based on the coordinates of a rendering start position of the second floating image to be regenerated through the image regeneration block 175c.

The processor 170 may regenerate the second floating image into a third floating image of a smaller size through the image regeneration block 175a when the gaze is not moved upward in the state where the upper portion of the second floating image has been cut off. The third floating image may have higher resolution than the second floating image and may be disposed within the active region. The third floating image may be scaled down in size as the rendering start position of the third floating image is moved downward.

Hereinafter, a description will be given of an exemplary embodiment, in which a lower portion of a floating image, which has been partially cut off, is restored according to a gaze movement, with reference to FIGS. 6 to 12. The processor 170 may receive information on second coordinates to which a floating image is to be moved through the position check block 175a. The processor 170 may determine whether the gaze is moved upward and whether an upper portion of a second floating image has been cut off based on the coordinates of a rendering start position of the second floating image to be regenerated through the image regeneration block 175c.

The processor 170 may regenerate the second floating image into a third floating image of a smaller size through the image regeneration block 175a when the gaze is not moved downward in the state where the lower portion of the second floating image has been cut off. The third floating image may have a higher resolution than the second floating image and may be disposed within the active region. The third floating image may be scaled down in size as the rendering start position of the third floating image is moved upward.

The foregoing description has been given of an electronic device for displaying a floating image according to one aspect of the disclosure. Hereinafter, a display device for displaying a floating image according to another aspect of the disclosure will be described. In this regard, all technical features of the electronic device for displaying the floating image may also be applied to the following display device. The display device for displaying the floating image may be, but is not limited to, a contactless display device such as a kiosk or signage. In this regard, FIG. 13 illustrates the configuration of a display device for displaying a floating image according to the disclosure.

Figure 13:
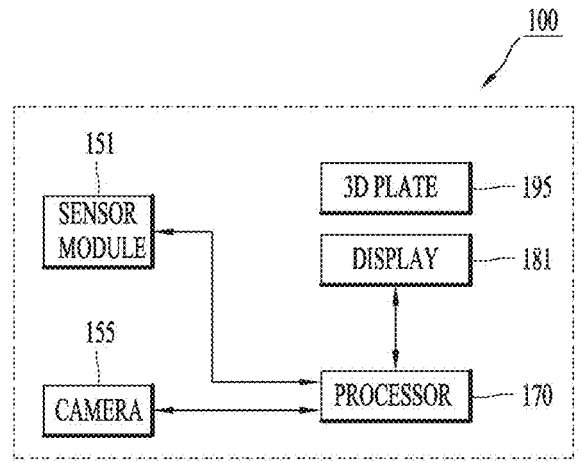
FIG. 13 illustrates the configuration of a display device for displaying a floating image according to the disclosure.

Referring to FIG. 13, the display device 100 may include a sensor module 151, a camera 155, a processor 170, a display 181, and a 3D plate 195.

Referring to FIGS. 6 to 13, the display 181 may be configured to display a floating image to float thereabove at a spacing. The floating image may be displayed to float above the display 181 to be substantially perpendicular to a horizontal plane of the display 181. The 3D plate 195 may be configured so that the display 181 is disposed in its inner region and a floating image is displayed in a tilted state within an upper area. The active region of the display 151 may be larger than a floating region where a floating image is displayed.

The sensor module 151 may be configured to recognize a user's touch input on a floating region where a floating image is displayed. The camera 155 may be configured to recognize the user's gaze and track the gaze. The camera 155 may be arranged on an inner plate 182 in the inner area of the 3D plate 195 and configured to track the user's gaze outside the 3D plate 195.

The display device 100 may control a location where the floating region is displayed based on the user's gaze. In this regard, the processor 170 may determine whether a portion, i.e., a lower portion of the floating image is not displayed as the gaze is moved upward. When it is determined that the lower portion as the portion of the floating image is not displayed, the processor 170 may control a guide image to be displayed in an upper area of the floating image. The processor 170 may control the display 181 so that the floating region is moved downward.

The processor 170 may determine whether a portion, i.e., an upper portion of the floating image is not displayed as the gaze is moved downward. When it is determined that the upper portion as the portion of the floating image is not displayed, the processor 170 may control a guide image to be displayed in a lower area of the floating image. The processor 170 may control the display 181 so that the floating region is moved upward.

The processor 170 may display a floating image on the display 181 when the gaze is within a vertical viewing angle range. When it is determined that the gaze is moved upward beyond the vertical viewing angle range, the processor 170 may control a guide image to be displayed in the upper area of the floating image. When it is determined that the gaze is moved downward beyond the vertical viewing angle range, the processor 170 may control a guide image to be displayed in the lower area of the floating image.

The processor 170 may display a floating image on the display 181 when the gaze is within the vertical viewing angle range. When the gaze is moved upward in the state where the lower portion of the floating image has been cut off, the processor 170 may render the floating image into a second floating image so that the floating image is moved upward. The second floating image may be a normal image which is displayed within the active region and in which the gaze is within the vertical viewing angle range.

Figure 14:
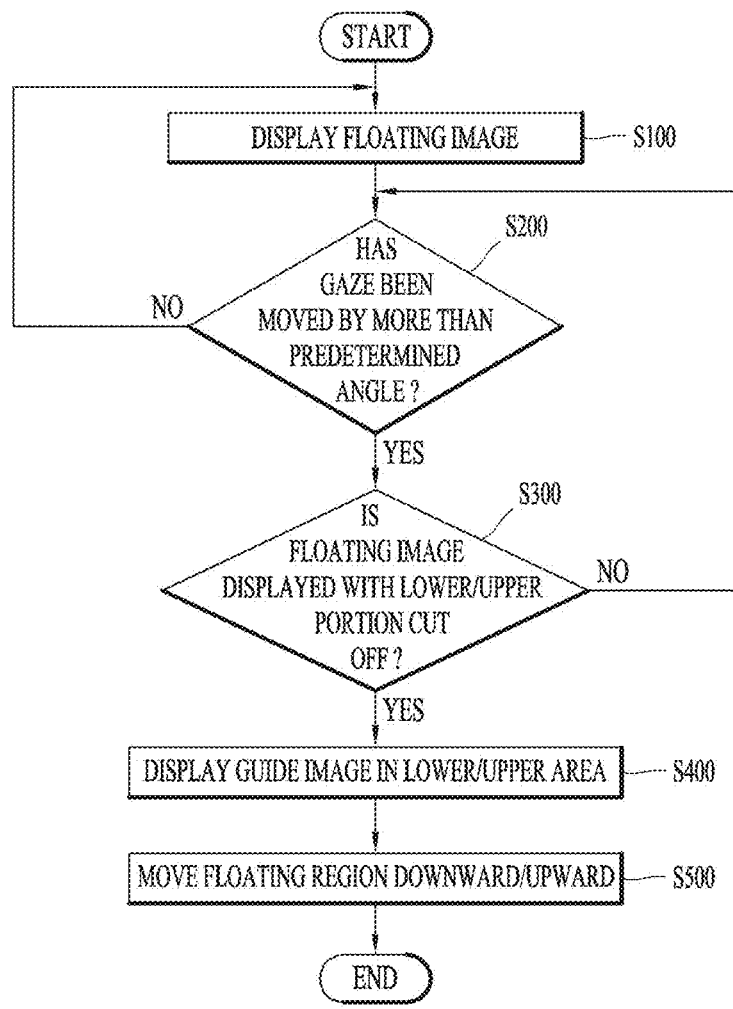
FIG. 14 is a flowchart illustrating a method for displaying a floating image according to the disclosure.

The foregoing description has been given of an electronic device and display device for displaying a floating image according to one aspect of the disclosure. Hereinafter, a description will be given of a method for displaying a floating image based on a user's gaze position according to another aspect of the disclosure. In this regard, all technical features of the electronic device and display device for displaying the floating image may also be applied to the following display device. The display device for displaying the floating image may be, but is not limited to, a contactless display device such as a kiosk or signage. In this regard, FIG. 14 is a flowchart illustrating a method for displaying a floating image according to the disclosure.

Referring to FIGS. 6 to 14, a method for displaying a floating image may be performed by the processor 170. The method for displaying a floating image may include a process of displaying a floating image (S100), a process of determining a gaze movement (S200), and a process of determining a display state of a lower/upper portion (S300). The method for displaying the floating image may further include a process of displaying a guide image (S400) and a process of moving a floating region (S500).

In the process of displaying the floating image (S100), the floating image may be controlled to be displayed in the active region of the display. In the process of determining the gaze movement (S200), it may be determined whether the user's gaze has been moved upward or downward by a predetermined angle or more. When it is determined that the gaze has not been moved by more than the predetermined angle in the process of determining the gaze movement (S210), the floating image displaying process (S100) may be performed again. When it is determined that the gaze has been moved by more than the predetermined angle in the process of determining the gaze movement (S210), the process of determining the display status of the lower/upper portion (S300) may be performed.

In the process of determining the display status of the lower/upper portion (S300), it may be determined whether the floating image is displayed with its lower portion partially cut off as the gaze is moved upward. In other words, it may be determined whether a portion of the floating image is not displayed. In the process of determining the display status of the lower/upper portion (S300), it may also be determined whether the floating image is displayed with its upper portion partially cut off as the gaze is moved downward. In other words, it may be determined whether a portion of the floating image is not displayed.

In the process of determining the display status of the lower/upper portion (S300), when it is determined that the lower portion of the floating image is not displayed, a guide image may be controlled to be displayed in the upper area of the floating image in the process of displaying the guide image (S400). In the process of determining the display status of the lower/upper portion (S300), when it is determined that the upper portion of the floating image is not displayed, a guide image may be controlled to be displayed in the lower area of the floating image in the process of displaying the guide image (S400). In the process of determining the display status of the lower/upper portion (S300), when it is determined that the lower portion or the upper portion of the floating image is fully displayed, the process of determining the gaze movement (S200) may be performed again.

As the guide image is displayed in the lower area of the floating image in the process of displaying the guide image (S400), the display may be controlled so that the floating region is moved downward in the process of moving the floating region (S500). Accordingly, the floating image within the floating region which has been moved downward may be displayed normally without the upper and lower portions being cut off.

As the guide image is displayed in the upper area of the floating image in the process of displaying the guide image (S400), the display may be controlled so that the floating region is moved downward in the process of moving the floating region (S500). Accordingly, the floating image within the floating region which has been moved upward may be displayed normally without the upper and lower portions being cut off.

The foregoing description has been given of an electronic device for displaying a floating image, a display device, and a control method thereof. The technical effects of the electronic device for displaying a floating image, the display device, and the control method thereof according to the specification will be summarized as follows, but are not limited thereto.

According to an embodiment, a problem that an image is partially cut off depending on a viewing angle in an electronic device (electronic equipment) for displaying a floating image may be solved.

According to an embodiment, various methods may be provided to improve a narrow vertical viewing angle of a floating 3D kiosk by recognizing and tracking a user's gaze.

According to an embodiment, an original image may be restored by changing an image display area when a portion of an image is cut off according to a user's viewing angle.

Another aspect of the disclosure, a floating image may be controlled to be displayed within a user's viewing angle range by providing a user guide UX/UI when a user's viewing angle exceeds a vertical movement range.

According to an embodiment, a floating image may be regenerated to be appropriate for a solution such as user gaze tracking and a gaze position, thereby securing a sufficient vertical viewing angle.

According to an embodiment, a display position of a floating image may be optimized upward or downward within an active region of a display by determining whether a user's gaze exceeds a vertical movement range.

According to an embodiment, a guide image may be provided in a vertical direction of a floating 3D image projected on a space using a user guide UX/UI to position a user's gaze within a viewing angle.

According to an embodiment, during viewing of a floating 3D image, there may be no limitation on a vertical viewing angle even when viewing positions of users, who have different heights, are moved up and down, so that the users can view the floating 3D image without a cutting issue.

According to an embodiment, a visually comfortable floating 3D image may be provided to users and technological differentiation from other technologies may be enabled by enhancing visibility.

Further scope of applicability of an electronic device for displaying a floating image according to the disclosure will become apparent from the detailed description. It should be understood, however, that the detailed description and specific examples, such as the preferred embodiments of the disclosure, are given by way of illustration only, since various changes and modifications within the spirit and scope of the disclosure will be apparent to those skilled in the art.

In relation to the aforementioned disclosure, the design and operations of an electronic device for displaying a floating image will be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element, and the like. Also, the computer-readable medium may be implemented as a format of carrier wave (e.g., transmission via the Internet). The computer may include the controller of the terminal. Therefore, the above detailed description should not be limitedly construed in all aspects and should be considered illustrative. The scope of the disclosure should be determined by rational construing of the appended claims, and all modifications within an equivalent scope of the disclosure are included in the scope of the disclosure.

The invention claimed is:

1. An electronic device for displaying a floating image, the electronic device comprising:
   a display configured to display the floating image to float thereabove at a spacing;
   a three-dimensional (3D) plate having the display arranged in an inner region thereof, and configured to display the floating image in a tilted state in an upper area;
   a camera disposed on an inner plate of the inner region, and configured to track a gaze of a user outside the 3D plate; and
   a processor operatively coupled to the camera and configured to control a floating region where the floating image is displayed to be moved upward or downward based on the tracked gaze,
   wherein an active region of the display is larger than the floating region is displayed,
   wherein the processor receives information on second coordinates, to which the floating image is to be moved, through a position check block,
   determines, based on coordinates of a rendering start position of a second floating image to be regenerated through an image regeneration block, whether the gaze is moved downward and whether an upper portion of the second floating image has been cut off,
   receives information on third coordinates, to which the second floating image is to be moved, through the position check block according to an upward movement of the gaze, when it is determined that the upper portion of the second floating image has been cut off, and
   displays a third floating image within the active region through the image regeneration block, based on the information on the third coordinates, to which the second floating image is to be moved, and
   the third floating image is displayed in a higher area within the active region than the second floating image.

2. The electronic device of claim 1, wherein the processor determines whether a lower portion as a portion of the floating image is not displayed as the gaze is moved upward, and
   controls a guide image to be displayed in an upper area of the floating image and controls the display such that the floating region is moved downward, when it is determined that the lower portion as the portion of the floating image is not displayed.

3. The electronic device of claim 1, wherein the processor determines whether an upper portion as a portion of the floating image is not displayed as the gaze is moved downward, and
   controls a guide image to be displayed in a lower area of the floating image and controls the display such that the floating region is moved upward, when it is determined that the upper portion as the portion of the floating image is not displayed.

4. The electronic device of claim 1, wherein the processor determines whether a portion of the floating image is not displayed as the floating region is moved to right or left within the active region, in response to the gaze being moved to left or right.

5. The electronic device of claim 4, wherein the processor controls, when it is determined that a left area or right area as the portion of the floating image is not displayed, a guide image to be displayed in the right area or left area of the floating image and controls the display such that the floating region is moved to right or left.

6. The electronic device of claim 1, wherein the processor comprises:
   an eye tracking block configured to execute image signal processing (ISP) and an eye tracking algorithm for an image input from the camera; and
   the position check block configured to determine whether the floating image is visible without a partial area being cut off, based on a user's eye position acquired by the eye tracking block.

7. The electronic device of claim 6, wherein the processor comprises:
   an image generation block configured to generate the floating image so that the floating image is displayed at a corresponding position according to a user's touch input; and
   the image regeneration block configured to receive information on coordinates, to which the floating image is to be moved, from the position check block, and regenerate the floating image into the second floating image so that a display position of the floating image is changed.

8. The electronic device of claim 1, wherein the processor displays the floating image when the gaze belongs to a vertical viewing angle range,
   determines whether the gaze is moved upward and whether a lower portion of the floating image has been cut off, based on coordinates of a rendering start position which is a position of a lower portion where the floating image is rendered, and determines whether the gaze is moved upward and whether the lower portion of the floating image has been cut off, based on the coordinates of the rendering start position of the floating image and size information on the floating image.

9. The electronic device of claim 1, wherein the processor displays the floating image when the gaze belongs to a vertical viewing angle range, controls a guide image to be displayed in an upper area of the floating image when it is determined that the gaze is moved upward out of the vertical viewing angle range, and controls a guide image to be displayed in a lower area of the floating image when it is determined that the gaze is moved downward out of the vertical viewing angle range.

10. The electronic device of claim 1, wherein the processor displays the floating image when the gaze belongs to a vertical viewing angle range, and renders the floating image into the second floating image so that the floating image is moved upward, when the gaze is moved upward in a state where a lower portion of the floating image has been cut off, and the second floating image is a normal image which is displayed within the active region and in which the gaze is within the vertical viewing angle range.

11. The electronic device of claim 1, wherein the processor displays the floating image when the gaze belongs to a vertical viewing angle range, and renders the floating image into the third floating image so that the floating image is moved downward, when the gaze is moved downward in a state where an upper portion of the floating image has been cut off, and the third floating image is a normal image which is displayed within the active region and in which the gaze is within the vertical viewing angle range.

12. The electronic device of claim 9, wherein the processor receives information on second coordinates, to which the floating image is to be moved, through the position check block, determines whether the gaze is moved upward and whether a lower portion of the second floating image has been cut off, based on coordinates of a rendering start position of a second floating image to be regenerated through the image regeneration block, receives information on third coordinates, to which the second floating image is to be moved, from the position check block according to a downward movement of the gaze, when it is determined that a lower portion of the second floating image has been cut off, and displays the third floating image within the active region through the image regeneration block, based on the information on the third coordinates, to which the floating image is to be moved, and the third floating image is displayed in a lower area within the active region than the second floating image.

13. The electronic device of claim 9, wherein the processor receives information on second coordinates, to which the floating image is to be moved, through the position check block, determines whether the gaze is moved downward and whether an upper portion of the second floating image has been cut off, based on coordinates of a rendering start position of the second floating image to be regenerated through the image regeneration block, and regenerates the second floating image into the third floating image of a smaller size through the image regeneration block, when the gaze is not moved upward while the upper portion of the second floating image is cut off, and the third floating image has a higher resolution than the second floating image and is disposed within the active region.

14. The electronic device of claim 13, wherein the processor receives information on the second coordinates, to which the floating image is to be moved, through the position check block, determines whether the gaze is moved upward and whether a lower portion of the second floating image has been cut off, based on coordinates of a rendering start position of the second floating image to be regenerated through the image regeneration block, and regenerates the second floating image into the third floating image of a smaller size through the image regeneration block, when the gaze is not moved downward while the lower portion of the second floating image is cut off, and the third floating image has a higher resolution than the second floating image and is disposed within the active region.

* * * * *